US011380448B2

(12) United States Patent
Callaway et al.

(10) Patent No.: US 11,380,448 B2
(45) Date of Patent: Jul. 5, 2022

(54) CONTROLLING A POWER OUTPUT OF A NUCLEAR REACTION WITHOUT CONTROL RODS

(71) Applicant: NuScale Power, LLC, Corvallis, OR (US)

(72) Inventors: Allyson Callaway, Corvallis, OR (US); Ben Bristol, Philomath, OR (US); Kenneth Rooks, Corvallis, OR (US); Larry Linik, Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 484 days.

(21) Appl. No.: 16/237,059

(22) Filed: Dec. 31, 2018

(65) Prior Publication Data

US 2020/0027604 A1 Jan. 23, 2020

Related U.S. Application Data

(60) Provisional application No. 62/611,795, filed on Dec. 29, 2017, provisional application No. 62/611,819, filed on Dec. 29, 2017.

(51) Int. Cl.
*G21C 7/12* (2006.01)
*G21D 3/14* (2006.01)
(Continued)

(52) U.S. Cl.
CPC ............ *G21C 7/22* (2013.01); *G21C 7/12* (2013.01); *G21C 9/033* (2013.01); *G21D 3/14* (2013.01);
(Continued)

(58) Field of Classification Search
CPC .. G21D 3/18; G21D 3/02; G21D 3/14; G21D 3/16; G21D 1/006; G21D 5/08;
(Continued)

(56) References Cited

U.S. PATENT DOCUMENTS 3,151,034 A * 9/1964 Douglass, Jr. ............ G21C 1/12
376/395
5,180,543 A * 1/1993 Conway .................. G21C 15/18
376/282
(Continued)

FOREIGN PATENT DOCUMENTS

JP S64 20493 A 1/1989
JP H06 174870 A 6/1994

OTHER PUBLICATIONS

International Search Report and Written Opinion; PCT/US2018/068040; dated Nov. 6, 2019; pp. 1-22.
(Continued)

*Primary Examiner* — Darlene M Ritchie
(74) *Attorney, Agent, or Firm* — Perkins Coie LLP

(57) ABSTRACT

A nuclear power system includes a reactor vessel that includes a reactor core mounted therein. The reactor core includes nuclear fuel assemblies configured to generate a nuclear fission reaction. The reaction vessel does not include any control rod assemblies therein. The nuclear power system further includes a riser positioned above the reactor core, a primary coolant flow path, a primary coolant that circulates through the primary coolant flow path to receive heat from the nuclear fission reaction and release the received heat to generate electric power in a power generation, and a control system communicably coupled to the power generation system and configured to control a power output of the nuclear fission reaction independent of any control rod assemblies.

18 Claims, 10 Drawing Sheets

(51) Int. Cl.
*G21D 3/16* (2006.01)
*G21D 3/18* (2006.01)
*G21C 7/22* (2006.01)
*G21C 9/033* (2006.01)
*G21C 7/24* (2006.01)
*F22B 35/00* (2006.01)
*G21D 1/00* (2006.01)
*G21D 3/02* (2006.01)
*G21D 5/08* (2006.01)
*G21C 1/02* (2006.01)
*G21C 7/08* (2006.01)
*G21C 9/02* (2006.01)
*G21C 13/02* (2006.01)

(52) U.S. Cl.
CPC ............. *G21D 3/16* (2013.01); *G21D 3/18* (2013.01); *F22B 35/004* (2013.01); *G21C 1/028* (2013.01); *G21C 7/08* (2013.01); *G21C 7/24* (2013.01); *G21C 9/02* (2013.01); *G21C 13/022* (2013.01); *G21D 1/006* (2013.01); *G21D 3/02* (2013.01); *G21D 5/08* (2013.01)

(58) Field of Classification Search
CPC ... G21C 7/08; G21C 7/22; G21C 7/12; G21C 7/24; G21C 9/033; G21C 9/02; G21C 1/028; G21C 13/02; G21C 13/022; F22B 35/004; Y02E 30/00; Y02E 30/30
USPC .......................................... 376/277, 282, 306
See application file for complete search history.

(56) References Cited

U.S. PATENT DOCUMENTS

| | | | |
|---|---|---|---|
| 6,895,068 B2* | 5/2005 | Hartel | G21C 15/18 376/283 |
| 2010/0316177 A1 | 12/2010 | Stambaugh et al. | |
| 2014/0105348 A1 | 4/2014 | Lin-Hendel | |
| 2015/0228363 A1* | 8/2015 | Dewan | G21C 3/06 376/458 |
| 2016/0148709 A1* | 5/2016 | Reyes, Jr. | G21C 1/322 376/214 |
| 2017/0243664 A1* | 8/2017 | Scott | G21C 1/14 |
| 2017/0301419 A1* | 10/2017 | Henras | G21C 5/18 |
| 2020/0027592 A1 | 1/2020 | Linik et al. | |
| 2020/0027603 A1 | 1/2020 | Callaway et al. | |
| 2020/0105425 A1* | 4/2020 | Cheatham, III | G21C 7/30 |
| 2020/0365285 A1* | 11/2020 | Heibel | G21D 3/001 |

OTHER PUBLICATIONS

En.wikipedia.org [online], "Scram," available on or before Jul. 21, 2017, via Internet Archive: Wayback Machine URL<https://web.archive.org/web/20170721151206/https://en.wikipedia.org/wiki/Scram>, retrieved on Apr. 11, 2019, URL<https://en.wikipedia.org/wiki/Scram>, 6 pages.

En.wikipedia.org [online], "Scram," Last updated Mar. 18, 2019, [retrieved on Apr. 11, 2019], retrieved from: URL<https://en.wikipedia.org/wiki/Scram>. 6 pages.

Mirsky, "Reactivity Control Design and Licensing Basis" NuScale Power, May 2016.

Park, "A Conceptual Study on a Method of Boron Powder Direct Vessel Injection" Proceedings of the KAIS Fall Conference, The Korea Academia-Industrial cooperation Society, pp. 58-61, 2004.

* cited by examiner

CONTROLLING A POWER OUTPUT OF A NUCLEAR REACTION WITHOUT CONTROL RODS

CROSS-REFERENCE TO RELATED APPLICATIONS

This application claims priority to U.S. Provisional Patent Application Ser. No. 62/611,795, filed on Dec. 29, 2017, entitled "Passive Boron Injection System," and U.S. Provisional Patent Application Ser. No. 62/611,819, filed on Dec. 29, 2017, entitled "Reactor Module (RXM) Without Control Rod Assemblies and Other Systems, Structures and Components." The entire contents of both previous applications are incorporated by reference herein.

STATEMENT REGARDING FEDERALLY SPONSORED RESEARCH OR DEVELOPMENT

This invention was made with Government support under Contract No. DE-NE0000633 awarded by the Department of Energy. The Government has certain rights in this invention.

TECHNICAL FIELD

This document relates to systems and methods for controlling a nuclear reaction in a nuclear reactor power system.

BACKGROUND

In nuclear reactors designed with passive operating systems, the laws of physics are employed to ensure that safe operation of the nuclear reactor is maintained during normal operation or even in an emergency condition without operator intervention or supervision, at least for some predefined period of time.

SUMMARY

In an example implementation, a nuclear power system includes a reactor vessel that includes a reactor core mounted within a volume of the reactor vessel, the reactor core including one or more nuclear fuel assemblies configured to generate a nuclear fission reaction; a containment vessel sized to enclose the reactor vessel such that an open volume is defined between the containment vessel and the reactor vessel; and a boron injection system positioned in the open volume of the containment vessel and including an amount of boron sufficient to stop the nuclear fission reaction or maintain the nuclear fission reaction at a sub-critical state.

In an aspect combinable with the example implementation, the boron injection system includes a boron container sized to hold or enclose the amount of boron.

In another aspect combinable with any of the previous aspects, the boron container includes a openable enclosure that includes a latch actuatable by at least one of a temperature or a pressure.

In another aspect combinable with any of the previous aspects, the boron container includes a meltable or dissolvable member that encloses or surrounds the amount of boron.

In another aspect combinable with any of the previous aspects, the reactor vessel further includes at least one valve openable to fluidly couple the volume of the reactor vessel with the open volume of the containment vessel.

In another aspect combinable with any of the previous aspects, the at least one valve includes a reactor vent valve configured to vent a vaporized primary coolant from the volume of the reactor vessel to the open volume of the containment vessel; and a reactor recirculation valve configured to circulate a mixture of the vented primary coolant and at least a portion of the amount of boron to the reactor core.

In another aspect combinable with any of the previous aspects, the amount of boron is in solution with a condensed form of the vented primary coolant.

In another aspect combinable with any of the previous aspects, the vaporized primary coolant is at least one of a pressure or temperature sufficient to actuate the latch to release the amount of boron from the boron container into the open volume, or the vaporized primary coolant is at a temperature sufficient to melt or dissolve the member to release the amount of boron into the open volume.

In another aspect combinable with any of the previous aspects, the boron is solid boron in granular form.

In another aspect combinable with any of the previous aspects, the reactor vessel excludes control rod assemblies.

In another example implementation, a method for controlling a nuclear fission reaction includes operating a nuclear power system to generate a nuclear fission reaction, the nuclear power system including a reactor vessel that includes a reactor core mounted within a volume of the reactor vessel, the reactor core including one or more nuclear fuel assemblies configured to generate the nuclear fission reaction, a containment vessel sized to enclose the reactor vessel such that an open volume is defined between the containment vessel and the reactor vessel, and a boron injection system positioned in the open volume of the containment vessel and including an amount of boron; initiating an emergency operation of the nuclear power system based on a loss of a primary coolant from the volume of the reactor vessel to the open volume of the containment vessel; based on the emergency operation, releasing the amount of boron into the open volume of the containment vessel; circulating the amount of boron from the open volume of the containment vessel to the reactor core; and with the amount of boron, stopping the nuclear fission reaction or maintaining the nuclear fission reaction at a sub-critical state.

In an aspect combinable with the example implementation, releasing the amount of boron includes releasing the amount of boron from a boron container positioned in the open volume and sized to hold or enclose the amount of boron.

In another aspect combinable with any of the previous aspects, releasing the amount of boron from the boron container includes actuating a latch on the boron by at least one of a temperature or a pressure in the open volume of the containment vessel.

In another aspect combinable with any of the previous aspects, releasing the amount of boron from the boron container includes melting or dissolving at least a portion of the boron container based on a temperature in the open volume of the containment vessel.

Another aspect combinable with any of the previous aspects further includes, based on the emergency event, opening at least one valve on the reactor vessel to fluidly couple the volume of the reactor vessel with the open volume of the containment vessel.

In another aspect combinable with any of the previous aspects, opening at least one valve on the reactor vessel includes opening a reactor vent valve to vent a vaporized primary coolant from the volume of the reactor vessel to the open volume of the containment vessel; and opening a reactor recirculation valve to circulate a mixture of the vented primary coolant and at least a portion of the amount of boron to the reactor core.

In another aspect combinable with any of the previous aspects, the amount of boron is in solution with a condensed form of the vented primary coolant.

In another aspect combinable with any of the previous aspects, the vaporized primary coolant is at least one of a pressure or temperature sufficient to actuate the latch to release the amount of boron from the boron container into the open volume, or the vaporized primary coolant is at a temperature sufficient to melt or dissolve the member to release the amount of boron into the open volume.

In another aspect combinable with any of the previous aspects, the boron is solid boron in granular form.

Another aspect combinable with any of the previous aspects further includes operating the nuclear power system to generate the nuclear fission reaction without any operation of control rod assemblies.

In another example implementation, a nuclear power system includes a reactor vessel that includes a reactor core mounted within a volume of the reactor vessel, the reactor core including one or more nuclear fuel assemblies configured to generate a nuclear fission reaction; a riser positioned above the reactor core; a primary coolant flow path that extends from a bottom portion of the volume below the reactor core, through the reactor core, within the riser, and through an annulus between the riser and the reactor vessel back to the bottom portion of the volume; a primary coolant that circulates through the primary coolant flow path to receive heat from the nuclear fission reaction and release the received heat to generate electric power in a power generation system fluidly or thermally coupled to the primary coolant flow path; and a control rod assembly system positioned in the reactor vessel and configured to position a plurality of control rods in only two discrete positions, such that the plurality of control rods are fully withdrawn from the reactor core in a first discrete position of the only two discrete positions and the plurality of control rods are fully inserted into the reactor core in a second discrete position of the only two discrete positions.

In an aspect combinable with the example implementation, the control rod assembly is configured to adjust the plurality of control rods from the first discrete position to the second discrete position by at least one of releasing the plurality of control rods to fall to the second discrete position from the first discrete position; or forcibly urging the plurality of control rods from the first discrete position to the second discrete position.

In another aspect combinable with any of the previous aspects, the plurality of control rods are sufficient to shut down the nuclear fission reaction or maintain the nuclear fission reaction at a sub-critical state in the second discrete position.

Another aspect combinable with any of the previous aspects further includes a control system communicably coupled to the power generation system and configured to control a power output of the nuclear fission reaction independent of the control rod assembly system during a normal operation of the nuclear power system.

In another aspect combinable with any of the previous aspects, the control system is configured to perform operations to control one or more parameters of the power generation system including determining that the power output of the nuclear fission reaction is greater than an upper value or less than a lower value; based on the determination, controlling the power generation system to adjust at least one of a turbine inlet steam valve or a feed water pump to adjust the power output of the nuclear fission reaction; and subsequent to the adjustment, determining that the power output is within a range between the upper and lower values.

In another aspect combinable with any of the previous aspects, the operation of controlling the power generation system to adjust at least one of the turbine inlet steam valve or the feed water pump to adjust the power output of the nuclear fission reaction includes at least one of adjusting the turbine inlet steam valve toward a fully closed position to decrease the power output of the nuclear fission reaction, or adjusting the turbine inlet steam valve toward a fully open position to increase the power output of the nuclear fission reaction; or decreasing an output flowrate of the feed water pump to decrease the power output of the nuclear fission reaction, or increasing the output flowrate of the feed water pump to increase the power output of the nuclear fission reaction.

In another aspect combinable with any of the previous aspects, the control system is configured to perform operations to control one or more parameters of the chemical injection system including determining that the power output of the nuclear fission reaction is greater than an upper value or less than a lower value; based on the determination, adjusting an amount of a chemical injected into the reactor core from the chemical injection system to adjust the power output of the nuclear fission reaction; and subsequent to the adjustment, determining that the power output is within a range between the upper and lower values.

In another aspect combinable with any of the previous aspects, the operation of adjusting the amount of the chemical injected into the reactor core from the chemical injection system includes at least one of increasing the amount of the chemical injected into the reactor core from the chemical injection system to decrease the power output of the nuclear fission reaction; or decreasing the amount of the chemical injected into the reactor core from the chemical injection system to increase the power output of the nuclear fission reaction.

In another example implementation, a method for controlling a nuclear fission reaction includes operating a nuclear power system to initiate a nuclear fission reaction, the nuclear power system including a reactor vessel that includes a reactor core mounted within a volume of the reactor vessel, the reactor core including one or more nuclear fuel assemblies configured to initiate and maintain the nuclear fission reaction during a normal operation, a riser positioned above the reactor core, and a primary coolant flow path that extends from a bottom portion of the volume below the reactor core, through the reactor core, within the riser, and through an annulus between the riser and the reactor vessel back to the bottom portion of the volume; circulating a primary coolant through the primary coolant flow path to receive heat from the nuclear fission reaction; transferring the received heat into a power generation system fluidly or thermally coupled to the primary coolant flow path to generate electric power; and operating a control rod assembly system positioned in the reactor vessel to adjust a position of a plurality of control rods from a first discrete position of only two discrete positions to a second discrete position of the only two discrete positions, such that the plurality of control rods are fully withdrawn from the reactor core in the first discrete position and the plurality of control rods are fully inserted into the reactor core in the second discrete position.

In an aspect combinable with the example implementation, adjusting the plurality of control rods from the first discrete position to the second discrete position includes at least one of releasing the plurality of control rods to fall to the second discrete position from the first discrete position; or forcibly urging the plurality of control rods from the first discrete position to the second discrete position.

In another aspect combinable with any of the previous aspects, the plurality of control rods are sufficient to shut down the nuclear fission reaction or maintain the nuclear fission reaction at a sub-critical state in the second discrete position.

Another aspect combinable with any of the previous aspects further includes controlling a power output of the nuclear fission reaction independent of any control rod assemblies during the normal operation.

In another aspect combinable with any of the previous aspects, the nuclear power system further includes a chemical injection system in fluid communication with the primary coolant flow path.

Another aspect combinable with any of the previous aspects further includes controlling the power output of the nuclear fission reaction independent of any control rod assemblies by controlling one or more parameters of at least one of the power generation system or the chemical injection system during normal operation.

Another aspect combinable with any of the previous aspects further includes determining that the power output of the nuclear fission reaction is greater than an upper value or less than a lower value; based on the determination, controlling the power generation system to adjust at least one of a turbine inlet steam valve or a feed water pump to adjust the power output of the nuclear fission reaction; and subsequent to the adjustment, determining that the power output is within a range between the upper and lower values.

In another aspect combinable with any of the previous aspects, controlling the power generation system to adjust at least one of the turbine inlet steam valve or the feed water pump to adjust the power output of the nuclear fission reaction includes at least one of adjusting the turbine inlet steam valve toward a fully closed position to decrease the power output of the nuclear fission reaction, or adjusting the turbine inlet steam valve toward a fully open position to increase the power output of the nuclear fission reaction; or decreasing an output flowrate of the feed water pump to decrease the power output of the nuclear fission reaction, or increasing the output flowrate of the feed water pump to increase the power output of the nuclear fission reaction.

Another aspect combinable with any of the previous aspects further includes determining that the power output of the nuclear fission reaction is greater than an upper value or less than a lower value; based on the determination, adjusting an amount of a chemical injected into the reactor core from the chemical injection system to adjust the power output of the nuclear fission reaction; and subsequent to the adjustment, determining that the power output is within a range between the upper and lower values.

In another aspect combinable with any of the previous aspects, adjusting the amount of the chemical injected into the reactor core from the chemical injection system includes at least one of increasing the amount of the chemical injected into the reactor core from the chemical injection system to decrease the power output of the nuclear fission reaction; or decreasing the amount of the chemical injected into the reactor core from the chemical injection system to increase the power output of the nuclear fission reaction.

In another example implementation, a pressurized water reactor (PWR) includes a reactor module that includes a reactor vessel including a volume sized to enclose a reactor core, a riser, and a steam generator, and a containment vessel including a volume sized to enclose the reactor vessel; and a plurality of control rods mounted in the reactor vessel above the reactor core on a control rod manifold, the control rod manifold attached to a control rod actuator operable to release the control rod manifold to drop the plurality of control rods from a first position above the reactor core to a second position within the reactor core.

In an aspect combinable with the example implementation, the control rod actuator is inoperable to move the control rod manifold to move the plurality of control rods from the second position to the first position.

In another aspect combinable with any of the previous aspects, the plurality of control rods are sufficient to shut down a nuclear fission reaction or maintain the nuclear fission reaction generated by one or more nuclear fuel assemblies in the reactor core at a sub-critical state in the second position.

In another example implementation, a nuclear power system includes a reactor vessel that includes a reactor core mounted within a volume of the reactor vessel, the reactor core including one or more nuclear fuel assemblies configured to generate a nuclear fission reaction; a riser positioned above the reactor core; a primary coolant flow path that extends from a bottom portion of the volume below the reactor core, through the reactor core, within the riser, and through an annulus between the riser and the reactor vessel back to the bottom portion of the volume; a primary coolant that circulates through the primary coolant flow path to receive heat from the nuclear fission reaction and release the received heat to generate electric power in a power generation system fluidly or thermally coupled to the primary coolant flow path; and a control system communicably coupled to the power generation system and configured to control a power output of the nuclear fission reaction independent of any control rod assemblies during the normal operation.

An aspect combinable with the example implementation further includes a chemical injection system in fluid communication with the primary coolant flow path, wherein the control system is communicably coupled to the chemical injection system and configured to control the power output of the nuclear fission reaction independent of any control rod assemblies by controlling one or more parameters of at least one of the power generation system or the chemical injection system during normal operation.

In another aspect combinable with any of the previous aspects, the control system is configured to perform operations to control one or more parameters of the power generation system including determining that the power output of the nuclear fission reaction is greater than an upper value or less than a lower value; based on the determination, controlling the power generation system to adjust at least one of a turbine inlet steam valve or a feed water pump to adjust the power output of the nuclear fission reaction; and subsequent to the adjustment, determining that the power output is within a range between the upper and lower values.

In another aspect combinable with any of the previous aspects, the operation of controlling the power generation system to adjust the turbine inlet steam valve includes at least one of adjusting the turbine inlet steam valve toward a fully closed position to decrease the power output of the nuclear fission reaction; or adjusting the turbine inlet steam valve toward a fully open position to increase the power output of the nuclear fission reaction.

In another aspect combinable with any of the previous aspects, the operation of controlling the power generation system to adjust the feed water pump includes at least one of decreasing an output flowrate of the feed water pump to decrease the power output of the nuclear fission reaction; or increasing the output flowrate of the feed water pump to increase the power output of the nuclear fission reaction.

In another aspect combinable with any of the previous aspects, the control system is configured to perform operations to control one or more parameters of the chemical injection system including determining that the power output of the nuclear fission reaction is greater than an upper value or less than a lower value; based on the determination, adjusting an amount of a chemical injected into the reactor core from the chemical injection system to adjust the power output of the nuclear fission reaction; and subsequent to the adjustment, determining that the power output is within a range between the upper and lower values.

In another aspect combinable with any of the previous aspects, the operation of adjusting the amount of the chemical injected into the reactor core from the chemical injection system includes at least one of increasing the amount of the chemical injected into the reactor core from the chemical injection system to decrease the power output of the nuclear fission reaction; or decreasing the amount of the chemical injected into the reactor core from the chemical injection system to increase the power output of the nuclear fission reaction.

In another example implementation, a method for controlling a nuclear fission reaction includes operating a nuclear power system to initiate a nuclear fission reaction, the nuclear power system including a reactor vessel that includes a reactor core mounted within a volume of the reactor vessel, the reactor core including one or more nuclear fuel assemblies configured to initiate and maintain the nuclear fission reaction during a normal operation, a riser positioned above the reactor core, and a primary coolant flow path that extends from a bottom portion of the volume below the reactor core, through the reactor core, within the riser, and through an annulus between the riser and the reactor vessel back to the bottom portion of the volume; circulating a primary coolant through the primary coolant flow path to receive heat from the nuclear fission reaction; transferring the received heat into a power generation system fluidly or thermally coupled to the primary coolant flow path to generate electric power; and controlling a power output of the nuclear fission reaction independent of any control rod assemblies during the normal operation.

In an aspect combinable with the example implementation, the nuclear power system further includes a chemical injection system in fluid communication with the primary coolant flow path.

Another aspect combinable with any of the previous aspects further includes controlling the power output of the nuclear fission reaction independent of any control rod assemblies by controlling one or more parameters of at least one of the power generation system or the chemical injection system during normal operation.

Another aspect combinable with any of the previous aspects further includes determining that the power output of the nuclear fission reaction is greater than an upper value or less than a lower value; based on the determination, controlling the power generation system to adjust at least one of a turbine inlet steam valve or a feed water pump to adjust the power output of the nuclear fission reaction; and subsequent to the adjustment, determining that the power output is within a range between the upper and lower values.

In another aspect combinable with any of the previous aspects, controlling the power generation system to adjust the turbine inlet steam valve includes at least one of adjusting the turbine inlet steam valve toward a fully closed position to decrease the power output of the nuclear fission reaction; or adjusting the turbine inlet steam valve toward a fully open position to increase the power output of the nuclear fission reaction.

In another aspect combinable with any of the previous aspects, controlling the power generation system to adjust the feed water pump includes at least one of decreasing an output flowrate of the feed water pump to decrease the power output of the nuclear fission reaction; or increasing the output flowrate of the feed water pump to increase the power output of the nuclear fission reaction.

Another aspect combinable with any of the previous aspects further includes determining that the power output of the nuclear fission reaction is greater than an upper value or less than a lower value; based on the determination, adjusting an amount of a chemical injected into the reactor core from the chemical injection system to adjust the power output of the nuclear fission reaction; and subsequent to the adjustment, determining that the power output is within a range between the upper and lower values.

In another aspect combinable with any of the previous aspects, adjusting the amount of the chemical injected into the reactor core from the chemical injection system includes at least one of increasing the amount of the chemical injected into the reactor core from the chemical injection system to decrease the power output of the nuclear fission reaction; or decreasing the amount of the chemical injected into the reactor core from the chemical injection system to increase the power output of the nuclear fission reaction.

In another example implementation, a pressurized water reactor (PWR) includes a control rod assembly-less reactor module that includes a reactor vessel including a volume sized to enclose a reactor core, a riser, and a steam generator without enclosing a control rod assembly system, and a containment vessel including a volume sized to enclose the reactor vessel; and a power generation system including a steam conduit in fluid communication with the steam generator, a steam turbine-generator, and a steam condenser.

In an aspect combinable with the example implementation, the volume of the reactor vessel is less than a volume of a conventional reactor vessel sized to enclose a control rod assembly system.

Another aspect combinable with any of the previous aspects further includes a control system communicably coupled to the reactor module and the power generation system, the control system configured to adjust a power output of one or more nuclear fuel assemblies in the reactor core by controlling at least one of a flowrate or pressure of a steam supply to the steam turbine generator or a flowrate or temperature of a feed water circulated from the steam condenser to the steam generator.

Another aspect combinable with any of the previous aspects further includes a passive boron injection system electrically decoupled from a Class 1E power source that is electrically coupled to the reactor module.

In another aspect combinable with any of the previous aspects, the passive boron injection system is positioned in the volume of the containment vessel and fluidly isolated from the volume of the reactor vessel during normal operation of the reactor module.

In another aspect combinable with any of the previous aspects, the passive boron injection system is configured to release an amount of solid boron sufficient to shut down a nuclear fission reaction of the reactor module during an emergency core cooling system (ECCS) event.

Various implementations according to the present disclosure may include one, some, or all of the following features. For example, implementations of a nuclear power system according to the present disclosure eliminate control rod assemblies and associated systems in a reactor module, thereby eliminating cost and space associated with installing such systems in the reactor module (e.g., lower material and installation costs in money and time). Further, potential nuisance trips and safety related concerns associated with control rod assemblies need not be accounted for in a nuclear power system with no control rod assemblies and systems. As another example, reactor start-up and shutdown procedures may be more efficiently performed in a nuclear power system that includes no control rod assemblies. As yet another example, operating costs of the reactor module may be reduced for a reactor module with no control rod assemblies compared to convention reactor systems with control rod assemblies. As yet another example, normal operational power output adjustment of the reactor module may more efficiently rely on control of one or more components of a power generation system thermally coupled to the reactor module and/or one or more components of a chemical injection system of a reactor module.

The present disclosure also describes implementations of a nuclear power system that includes a binary position control rod assembly system. In some aspects, such a nuclear power system may have lower manufacturing and installation costs in money and time, because the binary position control rod assembly system may include less complex control and installation designs.

The present disclosure also describes implementations of a nuclear power system that includes a passive boron injection system. In some aspects, such a system may allow for and facilitate the elimination of control rod assemblies from a reactor module. In some aspects, such a system may allow for and facilitate the use of a binary position control rod assembly system within a reactor module. As another example, such a system may allow for a shutdown of the reactor module (e.g., of the nuclear fission reaction) even with a loss of power (e.g., Class 1E power). As another example, such a system may allow for and facilitate the elimination of active boron systems, including liquid holding tanks, piping, and associated controls, thereby reducing time and cost in manufacturing and commissioning the reactor module.

The details of one or more embodiments are set forth in the accompanying drawings and the description below. Other features, objects, and advantages will be apparent from the description and drawings, and from the claims.

DETAILED DESCRIPTION

The present disclosure describes systems and methods related to controlling a nuclear reaction in a nuclear power module (e.g., a reactor module ("RXM")) of a nuclear power system. In some implementations, the systems and methods are associated with a passive boron injection system that may operate to control (e.g., shut down) a nuclear reaction during an emergency operation. The term "boron injection system," as used herein may utilize boron or other substances that absorb neutrons to reduce or shut down a nuclear fission reaction, such as silver, cadmium, indium, or hafnium.

In some implementations, a passive boron injection system according to the present disclosure may operate to ensure that a core of a RXM remains subcritical following an emergency core cooling system (ECCS) initiation. In some aspects, the passive boron injection system may operate even with a loss of Class 1E power to the RXM (and is, therefore, passively operated). In some aspects, the boron injection system does not include conventional holding tanks and piping typically associated with neutron absorption injection systems and further, may not hold the boron (or other material) in solution during non-operation.

The present disclosure also describes a nuclear power system, and specifically an implementation of a RXM, that excludes control rod assemblies and their related operational equipment. Thus, in some aspects, a fission reaction in such a RXM may be controlled (e.g., reduced or shut down) with, for example, an active neutron absorption injection system (such as an active boron injection system). In addition or alternatively, the fission reaction in such a RXM may be controlled (e.g., reduced or shut down) by, for example, controlling one or more parameters of a power generation system (e.g., a steam powered turbine power generator) that is fluidly coupled to a primary coolant of the RXM.

The present disclosure also describes a nuclear power system, and specifically an implementation of a RXM, that includes a binary position control rod assembly system. For example, in some aspects, a binary position control rod assembly (CRA) system may operationally exist in one (and only one) of two operational states at any moment in time. For example, one of the two operational states may be an "inactive" state in which every control rod assembly of the binary position CRA system is fully withdrawn from a core of the RXM and none of the control rod assemblies affect (i.e., absorb neutrons) an ongoing fission reaction that occurs in the core. The other of the two operational states may be an "active" state in which every control rod assembly of the binary position CRA system is fully inserted into the core of the RXM and all of the control rod assemblies operate to shut down the fission reaction that occurs in the core.

Figure 1A:
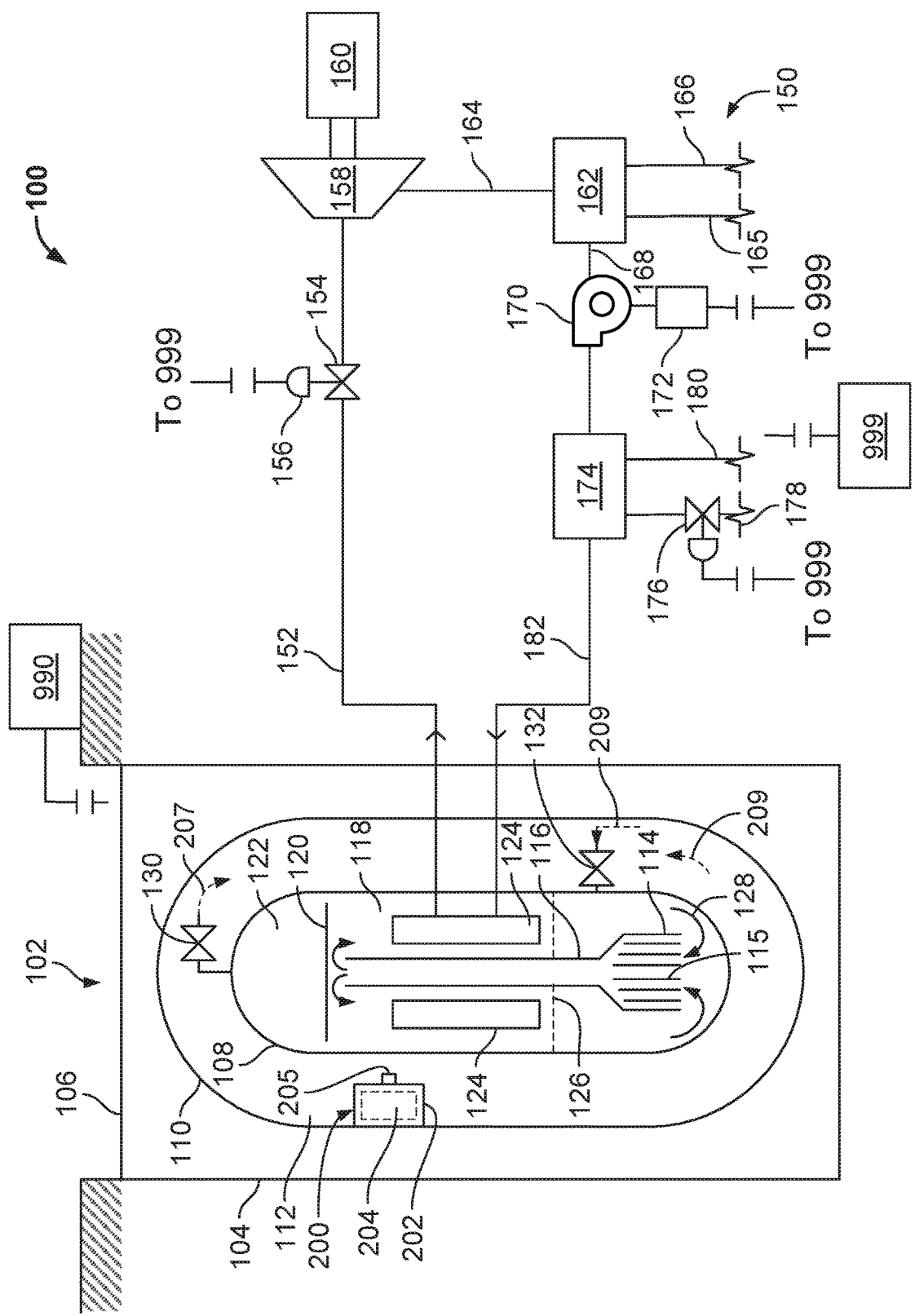
FIGS. 1A-1B are schematic illustrations of a nuclear power system that includes a boron injection system according to the present disclosure.
Figure 1B:
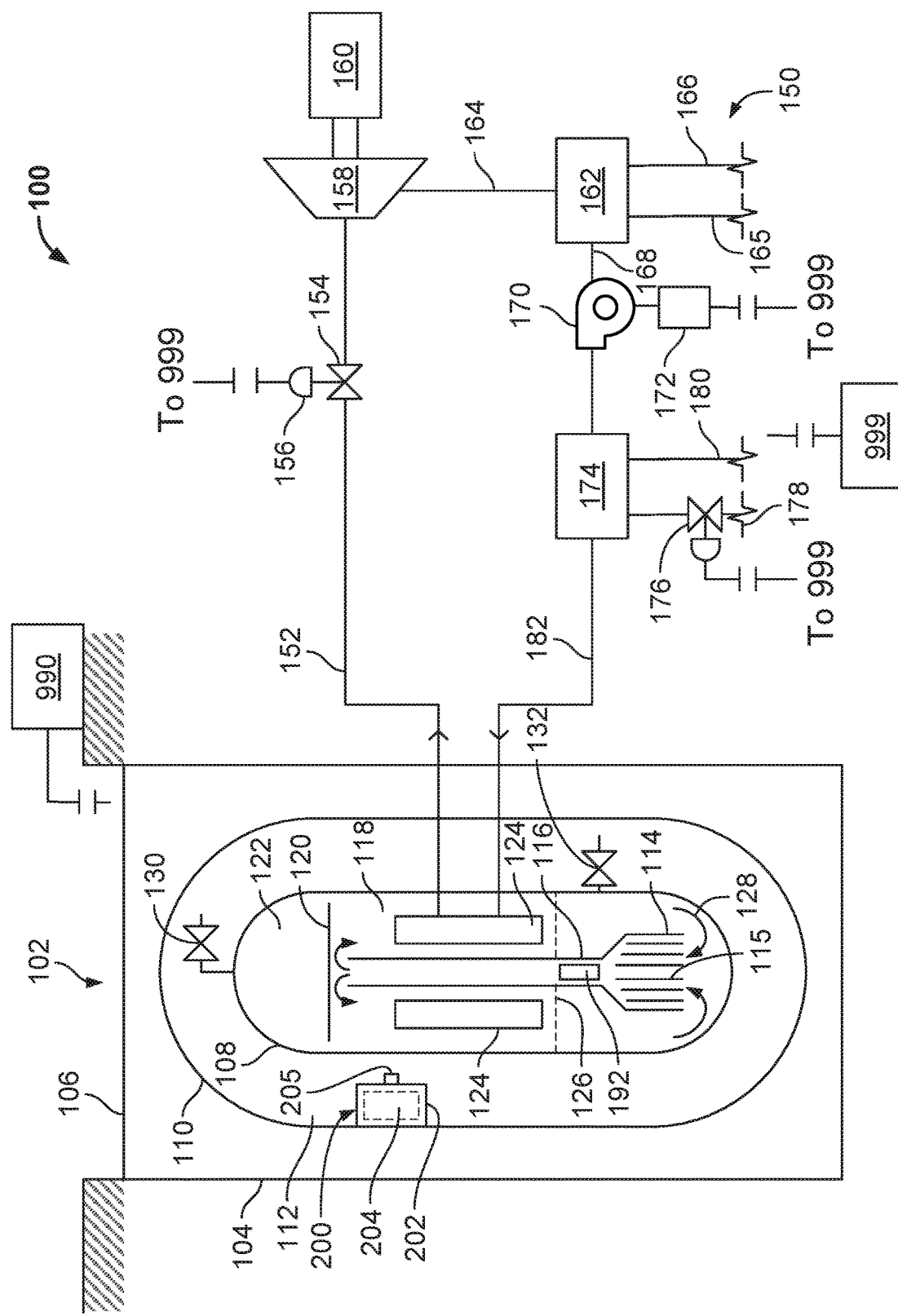

FIGS. 1A-1B illustrate example implementations of a nuclear power system 100 that includes a passive boron injection system 200. FIG. 1A illustrates an implementation in which the nuclear power system 100 includes the passive boron injection system 200 but excludes any control rod assembly system. FIG. 1B illustrates an implementation in which the nuclear power system 100 includes the passive boron injection system 200 and includes a conventional control rod assembly system in which one or more control rod assemblies may be incrementally inserted into a core of a nuclear reactor module to incrementally control (e.g., reduce or increase) a power output of the nuclear reactor module.

As shown in FIGS. 1A-1B, the nuclear power system 100 includes a nuclear reactor module (RXM) 102 and a power generation system 150 that is fluidly coupled to a primary coolant of the RXM 102. In some aspects, the RXM 102 may be a light water reactor, such as a pressurized water reactor (PWR) in which a primary coolant heats, but does not boil within the RXM 102. In other aspects, the RXM 102 may be a boiling water reactor (BWR) or condensing steam generator reactor, in which the primary coolant boils within the RXM 102. The illustrated examples of the RXM 102, however, are of a PWR that relies on natural circulation (e.g., rather than pumped, or forced, circulation) of a primary coolant to heat a secondary working fluid of the power generation system 150 within one or more heat exchangers (as described later).

The RXM 102 includes a reactor core 114 (that includes nuclear fuel assemblies 115) mounted in a volume 118 of a reactor vessel 108. Primary coolant 128 (e.g., water) in the reactor vessel 108 surrounds the reactor core 114. The reactor core 114 is further located in a shroud which surround the reactor core 114 about its sides. When the primary coolant 128 is heated by the reactor core 114 as a result of fission events, the primary coolant 128 is directed from the shroud and out of a riser 116 (and, normally, to a level 120 located in an upper portion 122 of the reactor vessel 108). This results in further primary coolant 128 being drawn into and heated by the reactor core 114 which draws yet more primary coolant 128 into the shroud. The primary coolant 128 that emerges from the riser 116 is cooled down and directed towards an annulus (e.g., between the riser 116 and the inside surface of the reactor vessel 108) and then returns to the bottom of the reactor vessel 108 through natural circulation. Thus, a flow path of the primary coolant generally starts at a bottom of the reactor vessel 108, extend upward through the core 114 and then the riser 116, exits the riser 116 near a top of the reactor vessel 108, and extends downward in the annulus between the riser 116 and the inside surface of the reactor vessel 108, back to the bottom of the reactor vessel 108.

The reactor core 114 is illustrated as being submerged or immersed in the primary coolant 128, such as water. The reactor vessel 108 houses the coolant 128 and the reactor core 114. A reactor housing (not shown) comprises a shroud in a lower portion and the riser 116 in an upper portion of the reactor housing. The shroud surrounds the reactor core 114 about its sides and serves to direct the coolant 128 (shown as arrows) up through the riser 116 located in the upper half of the reactor vessel 108 as a result of natural circulation of the coolant 128.

The reactor vessel 108 is surrounded by a containment vessel 110. The containment vessel 110 is designed so that water or steam from the reactor vessel 108 is not allowed to escape into the surrounding environment. A reactor vent valve 130 is provided to vent steam from the reactor vessel 108 into an upper half of the containment vessel 110, e.g., during an emergency event. A submerged reactor recirculation valve 132 (e.g., located on the reactor vessel 108 below a water line 126 of the primary coolant during an emergency situation) is provided fluidly couple a volume 122 of the reactor vessel 108 with a volume 112 of the containment vessel 110 during an emergency operation (e.g., loss of coolant situation).

As shown, the reactor vessel 108 is located or mounted inside the containment vessel 110. An inner surface of the reactor vessel 108 may be exposed to a wet environment including the primary coolant 128, and an outer surface may be exposed to a dry environment such as air. The reactor vessel 108 may be made of stainless steel or carbon steel, may include cladding, and may be supported within the containment vessel 110.

The reactor vessel 108 may include a predominately cylindrical shape with ellipsoidal, domed or spherical upper and lower ends. The reactor vessel 108 is normally at operating pressure and temperature. The containment vessel 110 is internally dry and may operate at atmospheric pressure with wall temperatures at or near the temperature of the pool of water 106.

The containment vessel 110 is cylindrical in shape, and has spherical, domed, or ellipsoidal upper and lower ends in this example implementation. The entire power module assembly (i.e., containment vessel 110 and enclosed reactor vessel 108) may be submerged in a containment pool of water 106 which serves as an effective heat sink. The pool of water 106 and the containment vessel 110 may further be located below ground in a reactor bay 104. The containment vessel 110 may be welded or otherwise sealed to the environment, such that liquids and gas do not escape from, or enter, the power module assembly. The containment vessel 110 may be supported at any external surface.

The containment vessel 110 encapsulates and, in some conditions, cools the reactor core 114. It is relatively small, has a high strength and may be capable of withstanding six or seven times the pressure of conventional containment designs in part due to its smaller overall dimensions. Given a break in the primary cooling system of the power module assembly, no fission products are released into the environment. The containment vessel 110 substantially surrounds the reactor vessel 108 and may provide a dry, voided, or gaseous environment identified as volume 112. Volume 112 may comprise an amount of air or other fill gas such as Argonne or other noble gas. The containment vessel 110 includes an inner surface or inner wall which is adjacent to the volume 112. The volume 112 may include a gas or gases instead of or in addition to air. In one embodiment, the volume 112 is maintained at or below atmospheric pressure, for example as a partial vacuum. Gas or gasses in the containment vessel may be removed such that the reactor vessel 108 is located in a complete or partial vacuum in the volume 112.

As shown in FIGS. 1A-1B, the power generation system 150 is fluidly coupled to the RXM 102 at heat exchangers (steam generators) 124 that are located within the reactor vessel 108. Pipes or other conduits fluidly connect the steam generators 124 with a steam flow 152 (on the "high pressure" side of the power generation system 150) and a feed water flow 182 (on the "low pressure" side of the power generation system 150). As shown, a steam inlet valve 154 (with actuator 156) is positioned in the steam flow 152 and upstream of a steam turbine 158. The steam turbine 158 is mechanically coupled to an electric power generator 160 (e.g., based on a flow of high pressure steam 152). Together, the steam inlet valve 154 and steam turbine 158 are on the high pressure side of the power generation system 150.

Downstream of the steam turbine 158 (i.e., on the low pressure side of the power generation system 150) is a heat exchanger condenser 162 that receives low pressure steam 164 and a condenser fluid supply 165, while outputting a condenser fluid return 166 (e.g., to one or more cooling towers). A condensed steam flow 168 (e.g., the feed water flow 182) is circulated to and by a pump 170 (which includes a pump motor controller 172). In this example implementation, another heat exchanger 174, which may be operated to either cool or heat the feed water flow 182 to a specified temperature, is fluidly coupled to the pump 170. As shown, heat exchanger 174, in this implementation, receives a fluid supply 178 (e.g., cooling or heating) through a valve 176 (with actuator 176) and outputs a fluid return 180.

During normal operation, thermal energy from the fission events in the reactor core 114 causes the coolant 128 to heat. As the coolant 128 heats up, it becomes less dense and tends to rise up through the riser 116. As the coolant 128 temperature reduces, it becomes relatively denser than the heated coolant and is circulated around the outside of the annulus, down to the bottom of the reactor vessel 108 and up through the shroud to once again be heated by the reactor core 114. This natural circulation causes the coolant 128 to cycle through the steam generators 124, transferring heat to a secondary coolant, such as the feed water flow 182 that is pumped (by pump 170) through the steam generators 124. Thus, feed water flow 182 is in thermal communication with (but fluidly isolated from) the primary coolant 128 in this example. As the feed water flow 182 is heated in the steam generators 124, it boils to form steam flow 152 (e.g., at a pressure sufficient to drive the steam turbine 158). Pressure of the steam flow 152 is controlled to the inlet of the steam turbine 158 by the steam valve 154.

High pressure steam flow 152 drives the steam turbine 158 to drive the generator 160 to produce electric power. Low pressure steam 164 from the turbine 158 flows to the condenser 162 and is condensed to feed water flow 168/182, where it is pumped back to the steam generators 124.

Figure 7:
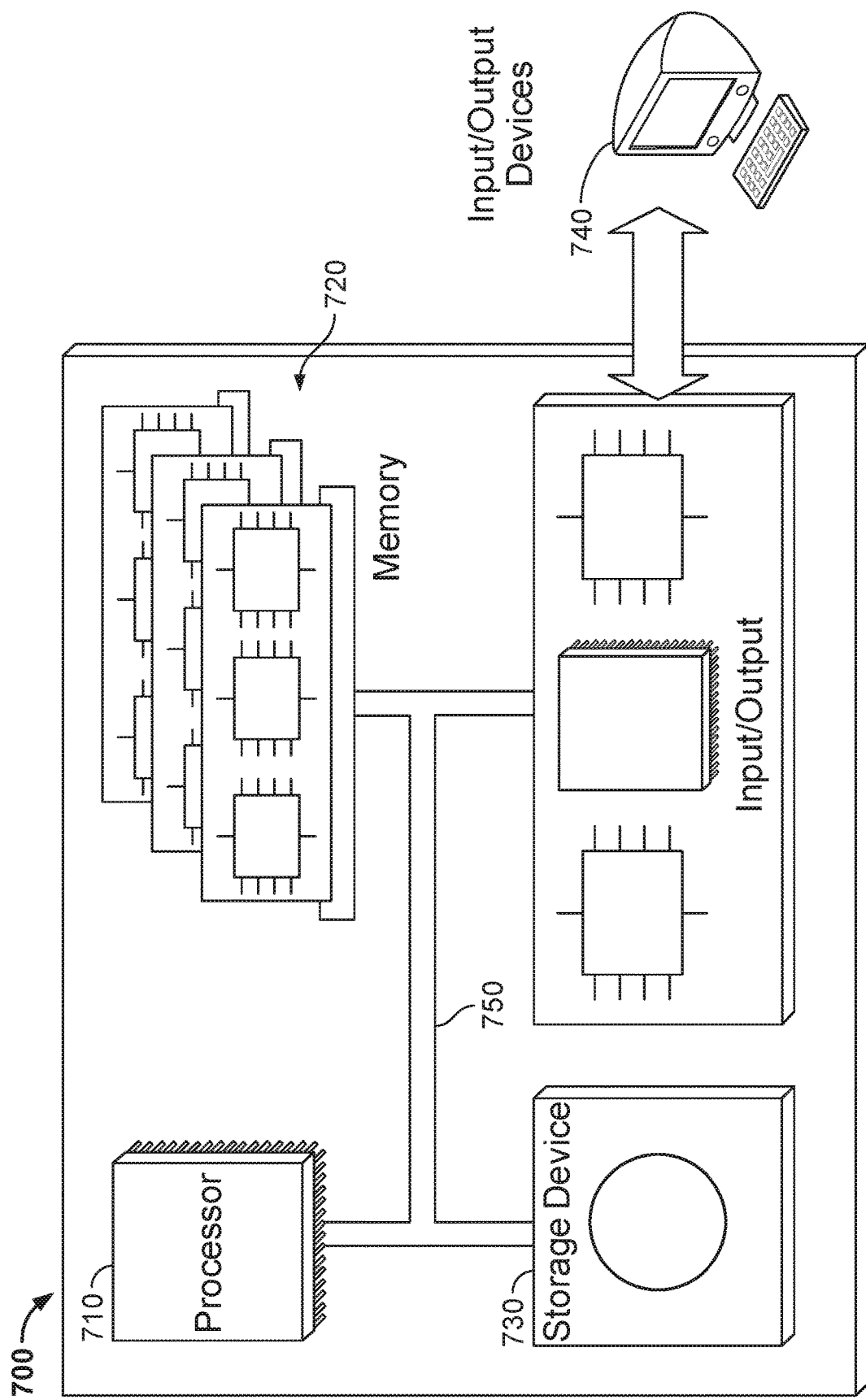
FIG. 7 illustrates a control system for all or part of a nuclear power system according to the present disclosure.

As shown in FIGS. 1A-1B, a control system 999 is communicably coupled to, for example, one or more components of the power generation system 150 and can also be communicably coupled to one or more components of the RXM 102. In some aspects, the control system 999 is configured to perform operations to control the nuclear power system 100 during normal operation as well as an emergency operation (e.g., loss of coolant, etc.). In some aspects, the control system 999 is a mechanical or electromechanical system. In other aspects, the control system 999 may be a pneumatic system. In other aspects, the control system 999 may be a microprocessor-based system that uses hardware, firmware, and software to control the nuclear power system 100 (such as shown in FIG. 7). In some aspects, the control system 999 may include a combination of these example systems.

The control system 999 may include or be a part of one or more flow control systems implemented throughout the nuclear power system 100. A flow control system can include one or more flow pumps to pump the process streams (e.g., feed water or otherwise), one or more flow pipes through which the process streams are flowed and one or more valves to regulate the flow of streams through the pipes. In some implementations, a flow control system can be operated manually. For example, an operator can set a flow rate for each pump and set valve open or close positions to regulate the flow of the process streams through the pipes in the flow control system. Once the operator has set the flow rates and the valve open or close positions for all flow control systems distributed across the crude oil refining facility, the flow control system can flow the streams within a plant or between plants under constant flow conditions, for example, constant volumetric rate or other flow conditions. To change the flow conditions, the operator can manually operate the flow control system, for example, by changing the pump flow rate or the valve open or close position. In some implementations, a flow control system can be operated automatically. For example, the flow control system can be connected to a computer system to operate the flow control system. The computer system can include a computer-readable medium storing instructions (such as flow control instructions and other instructions) executable by one or more processors to perform operations (such as flow control operations). An operator can set the flow rates and the valve open or close positions for all flow control systems distributed across the crude oil refining facility using the computer system. In such implementations, the operator can manually change the flow conditions by providing inputs through the computer system. Also, in such implementations, the computer system can automatically (that is, without manual intervention) control one or more of the flow control systems, for example, using feedback systems implemented in one or more plants and connected to the computer system. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to the computer system. In response to the flow condition exceeding a threshold (such as a threshold pressure value, a threshold temperature value, or other threshold value), the computer system can automatically perform operations. For example, if the pressure or temperature in the pipe exceeds the threshold pressure value or the threshold temperature value, respectively, the computer system can provide a signal to the pump to decrease a flow rate, a signal to open a valve to relieve the pressure, a signal to shut down process stream flow, or other signals.

As shown in FIG. 1A, the passive boron injection system 200 is positioned within the volume 112 of the containment vessel 110. In this example implementation, the passive boron injection system 200 includes a boron container 202 and boron portion 204 mounted within or to the boron container 202. In some aspects, boron portion 204 is a solid boron portion 204 (e.g., in granular form) as used throughout the present disclosure. In alternative aspects, boron portion 204 is in liquid form, with an amount of boron in solution.

As previously mentioned, although reference number 200 is called a "boron" injection system in the present disclosure, other neutron absorbing isotopes (e.g., of silver, cadmium, indium, or hafnium) may be included with or substituted for boron in the passive injection system 200 and, in some aspects, "boron" refers to the isotope boron-10. In some aspects, the "passive" system 200 may operate without electrical power, i.e., without Class 1E power being available to the system 200 (illustrated in FIGS. 1A-1B and 2A-2B as reference number 990, electrically coupled to one or more components of the RXM 102 and power generation system 150 but not the passive boron injection system 200). Although a single system 200 is shown, there may be multiple passive boron injection systems 200 positioned in the volume 112. Also, although the system 200 is shown near a top portion of the volume 112, the system 200 may be positioned anywhere in the volume 112.

Generally, the passive boron injection system 200 operates to release a specified amount of the solid boron portion 204 (e.g., all or part) into the volume 112 of the containment vessel 110 in response to an emergency event, such as an ECCS event. The solid boron portion 204 (which may be a solid block, solid pieces, or a granular solid) is sufficient in amount and concentration to, when released, shut down a nuclear fission reaction ongoing in the core 114 and/or prevent such a nuclear fission reaction from becoming critical. For example, the amount of boron (e.g., solid, in granular form), would be sufficient to raise a level of boron in the primary coolant 209 in the containment vessel volume 112 (that circulates back into the reactor vessel 108) to about 1,500 to 2,000 parts per million boron.

The example boron container 202 may be, for instance, a container with a temperature or pressure responsive opening mechanism 205. The opening mechanism 205, for example, may be a switch, latch, or lock that opens the container 202 at a particular pressure (or temperature) within the volume 112. In some aspects, the particular pressure may be at or near (e.g., just above) a release pressure setpoint of the reactor vent valve 130 (e.g., at or around 1850 psig). The particular temperature may be set below a temperature of high pressure steam that is released by the reactor vent valve 130 during an ECCS event.

In some aspects, the container 202 may be made of or comprise a thermoplastic member that contains the solid boron portion 204. As a thermoplastic (or other meltable) member, the container 202 may melt or disintegrate at a particular temperature within the volume 112 to release the solid boron portion 204 into the volume 112. In some aspects, the melting point of the container 202 may be at or near (e.g., just below) a temperature of the primary coolant 128 that is vented or circulated to the volume 112 during an ECCS event.

In some aspects, the container 202 may be made of or comprise a water-soluble member that contains the solid boron portion 204. As a water-soluble member, the container 202 may disintegrate upon being submerged in water (or another liquid) within the volume 112 to release the solid boron portion 204 into the volume 112, such as when placed into contact with primary coolant 128 that escapes the reactor vessel 108 into the volume 112 during an ECCS event.

FIG. 1B illustrates a similar implementation of the nuclear power system 100 as shown in FIG. 1A, but the system 100 in FIG. 1B includes a control rod assembly system 192 operable to insert one or more control rod assemblies into the core 114 during operation of the RXM 102. Thus, for example, the system 100 in FIG. 1A includes no control rod assemblies at all, while the system 100 in FIG. 1B includes a system that uses control rod assemblies to incrementally control (or shut down) the nuclear fission reaction and, thus, the power output by the RXM 102. In some aspects, the control rod assembly system 192 is a conventional CRA system in which one or more control rod assemblies may be incrementally inserted into and withdrawn from the core 114 to reduce or increase the nuclear fission reaction power output. Alternatively, in some aspects, the control rod assembly system 192 is a binary position CRA system (e.g., as described with reference to FIGS. 3A-3B) in which all of the control rod assemblies are either fully inserted into or fully withdrawn from the core 114 and are not incrementally insertable into the core 114 without being fully inserted (e.g., the CRA system 300 cannot stationarily position control rods at any position other than fully inserted or fully withdrawn).

In an example operation of the implementation of nuclear power system 100 shown in FIG. 1A, the RXM 102 (which includes no control rod assemblies) may be controlled during normal operation by, for example, controlling and adjusting one or more components of the power generation system 150 (explained more fully later). Thus, during normal operation, there are no control rod assemblies that adjust or help adjust the power output of the RXM 102. During normal operation, the passive boron injection system 200 located in the volume 112 of the containment vessel 110 is inactive. Once an emergency event occurs, such as an ECCS event, vaporized primary coolant 128 at a pressure greater than the vent pressure of reactor vent valve 130 is vented to the volume 112. Concurrently, due to the emergency event, the primary coolant 128 in the reactor vessel 108 is reduced to level 126.

As high pressure/high temperature steam vents to the volume 112 through valve 130, the passive boron injection system 200 is initiated. For example, the container 202 may open due to a rise in pressure in the volume 112 that unlocks or unlatches the container 202, thereby releasing the solid boron portion 204 into the volume 112. Alternatively, the container 202, as a thermoplastic, may melt or disintegrate due to the temperature and/or pressure in the volume 112 of the containment vessel 110, thereby releasing the solid boron portion 204 into the volume 112. Alternatively, the container 202, as a liquid soluble container, may dissolve or disintegrate due to the presence of liquid (e.g., condensed high pressure/high temperature steam that is cooled in the volume 112 by the pool 106) in the volume 112 of the containment vessel 110, thereby releasing the solid boron portion 204 into the volume 112.

Once released, the solid boron portion 204 mixes and goes into solution with the liquid primary coolant in the volume 112 of the containment vessel 110. This boron-saturated liquid then returns to the core 114 via the open reactor recirculation valve 132, thereby stopping the nuclear fission reaction and/or maintaining the nuclear fission reaction in a sub-critical state. Thus, an amount of the solid boron portion 204 is sufficient (e.g., in mass and/or concentration) to stop the nuclear fission reaction and/or maintain the nuclear fission reaction in a sub-critical state. In a "sub-critical" state, a nuclear fission reaction cannot be maintained (e.g., is effectively shut down), because a neutron population continues to decrease (more are destroyed than created).

In an example operation of the implementation of nuclear power system 100 shown in FIG. 1B, the RXM 102 (which includes no control rod assemblies) may be controlled during normal operation by, for example, controlling and adjusting the control rod assembly system 192 located in the reactor vessel 108. Thus, in some aspects, the power output of the RXM 102 is controlled (at least in part) by conventional control rod assembly insertion into the core 114 to control a level of the nuclear fission reaction during normal operation. However, in some aspects, during an emergency event, such as an ECCS event, the passive boron injection system 200 is initiated (and operates to shut down the reaction or maintain a subcritical reaction) rather than, for example, the control rod assembly system 192.

Figure 2A:
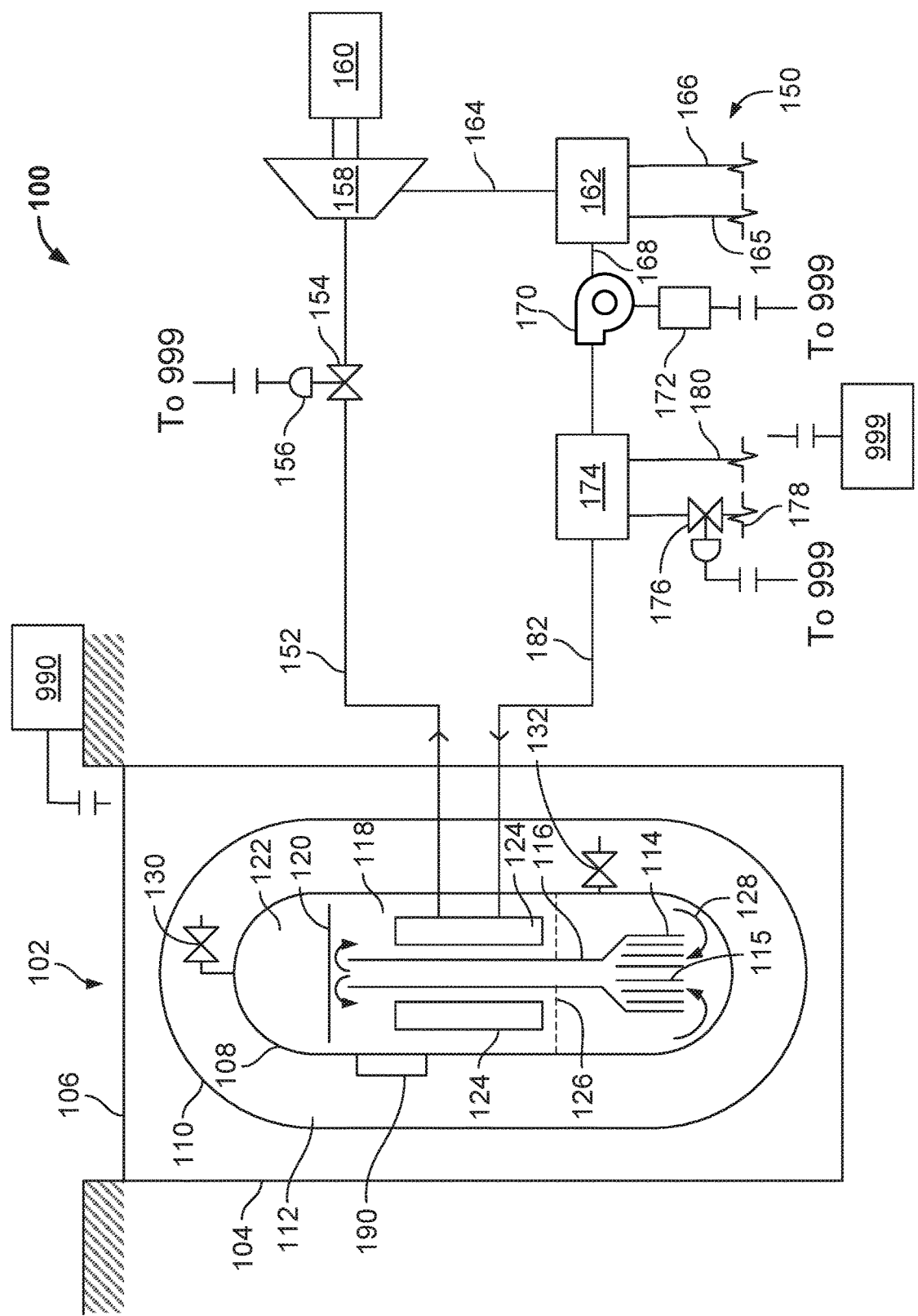
FIG. 2A is a schematic illustration of a nuclear power system that excludes control rod assemblies and related systems and components that control operation of control rod assemblies according to the present disclosure.
Figure 2B:
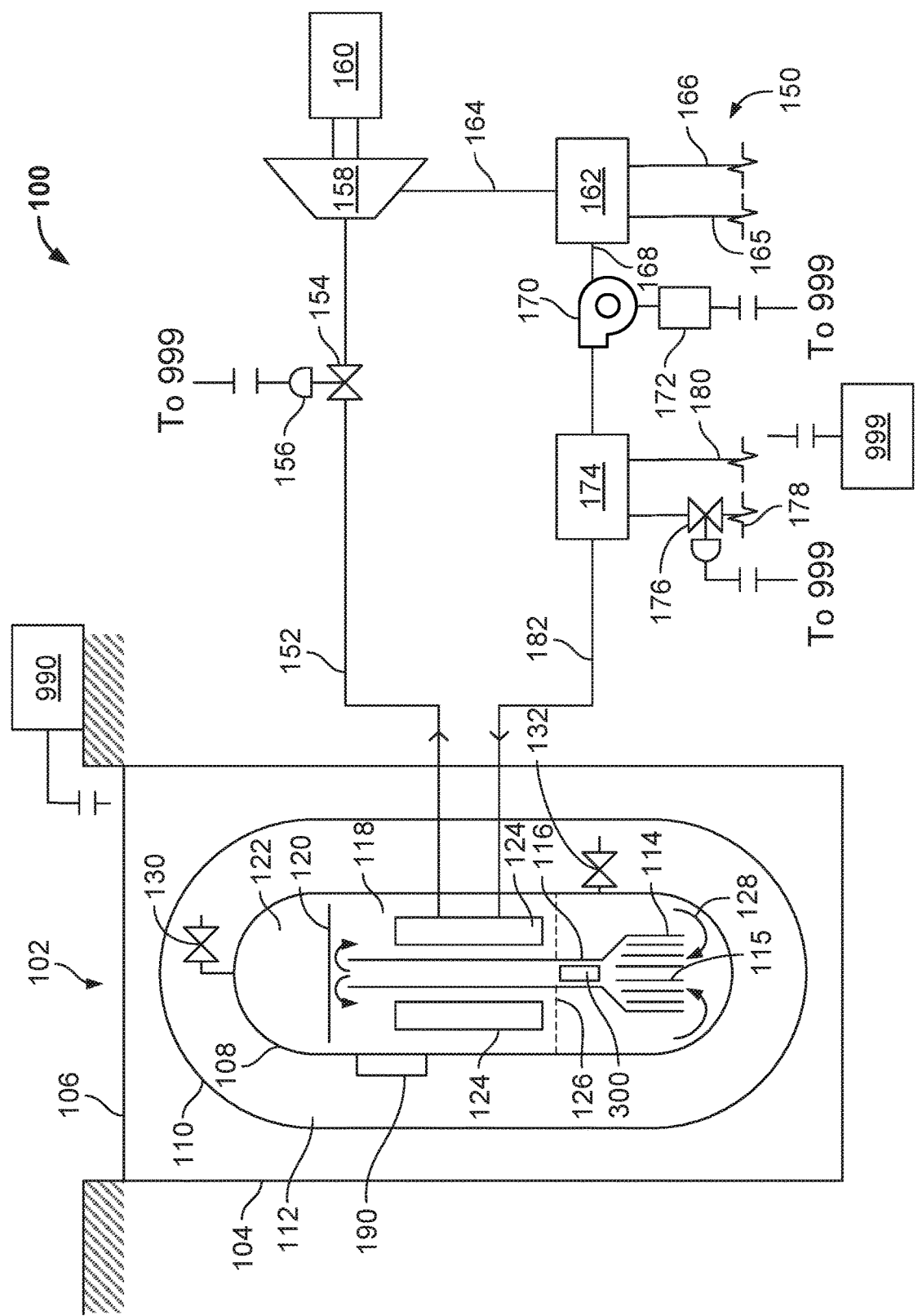
FIG. 2B is a schematic illustration of a nuclear power system that includes a binary positioning control rod assembly system according to the present disclosure.

FIGS. 2A-2B illustrate additional example implementations of the nuclear power system 100 (but these examples do not include the passive boron injection system 200). FIG. 2A illustrates an implementation in which the nuclear power system 100 excludes any control rod assembly system but does include a conventional chemical injection system 190 that operates to generally control a power output of the nuclear fission reaction by injecting or removing (as needed, depending on whether power is to be increased or decreased) liquid boron (or other neutron absorbing chemical) directly into the reactor vessel 108. FIG. 2B illustrates an implementation in which the nuclear power system 100 includes a binary position control rod assembly system 300 (e.g., as described with reference to FIGS. 3A-3B) in which all of the control rod assemblies are either fully inserted into or fully withdrawn from the core 114 and are not incrementally insertable into the core 114 without being fully inserted.

Thus, in an example operation of the system 100 shown in FIG. 2A, the RXM 102 (which includes no control rod assemblies) may be controlled during normal operation by, for example, controlling and adjusting one or more components of the power generation system 150 (explained more fully later). Thus, during normal operation, there are no control rod assemblies that adjust or help adjust the power output of the RXM 102 of FIG. 2A. During normal operation, the conventional chemical injection system 190 may control (e.g., adjust up or down) the power output of the RXM 102.

In an example operation of the system 100 shown in FIG. 2B, the RXM 102 (which includes the binary position control rod assembly system 300) may be controlled during normal operation by, for example, controlling and adjusting one or more components of the power generation system 150 (explained more fully later). Thus, during normal operation, the binary position control rod assembly system 300 does not adjust or help adjust the power output of the RXM 102 of FIG. 2B. During normal operation, the system 300 is inactive. Once an emergency event occurs, such as an ECCS event, the binary position control rod assembly system 300 may operate to shut down the nuclear fission reaction of the RXM 102 or maintain the nuclear fission reaction in a subcritical state by fully inserting one or more control rod assemblies from the system 300 into the core 114 of the RXM 102.

Figure 3A:
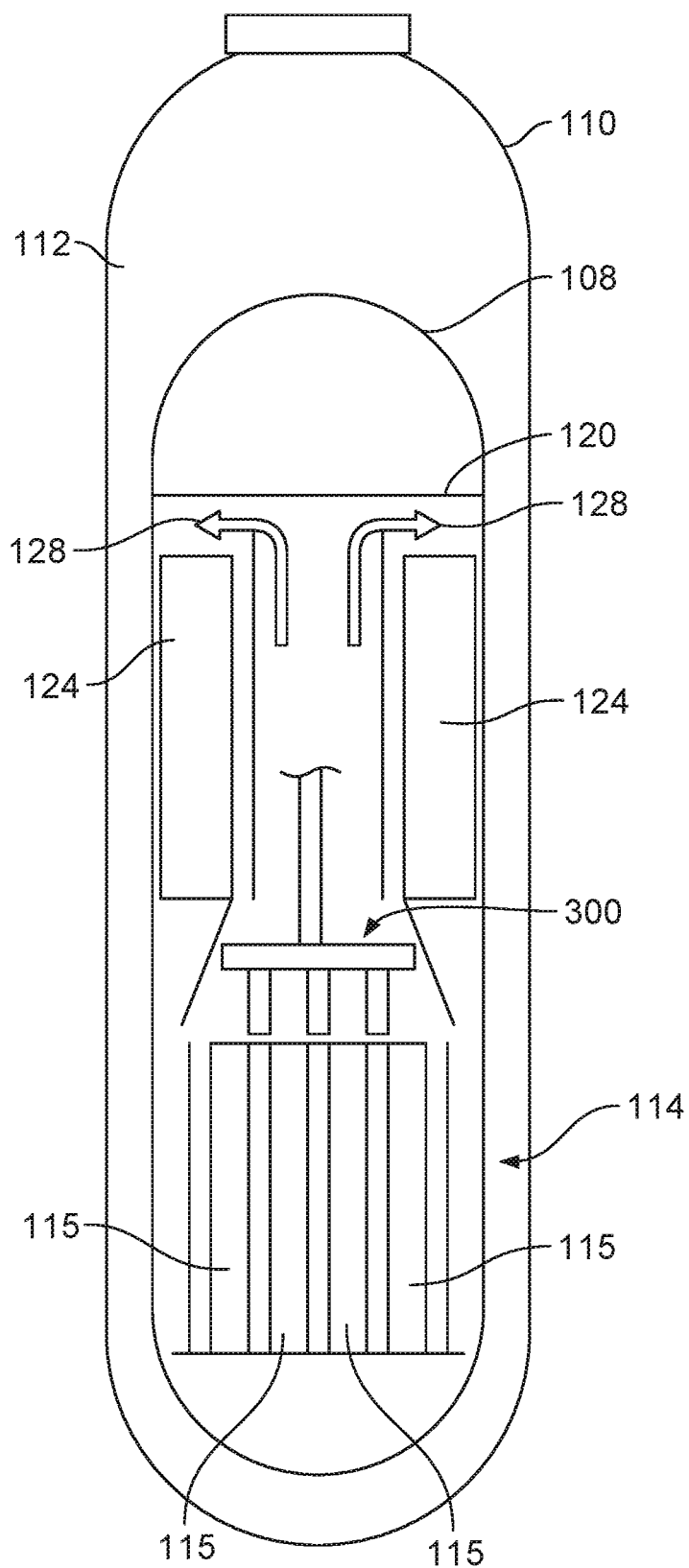
FIGS. 3A-3C are schematic illustrations of a binary positioning control rod assembly system according to the present disclosure.
Figure 3B:
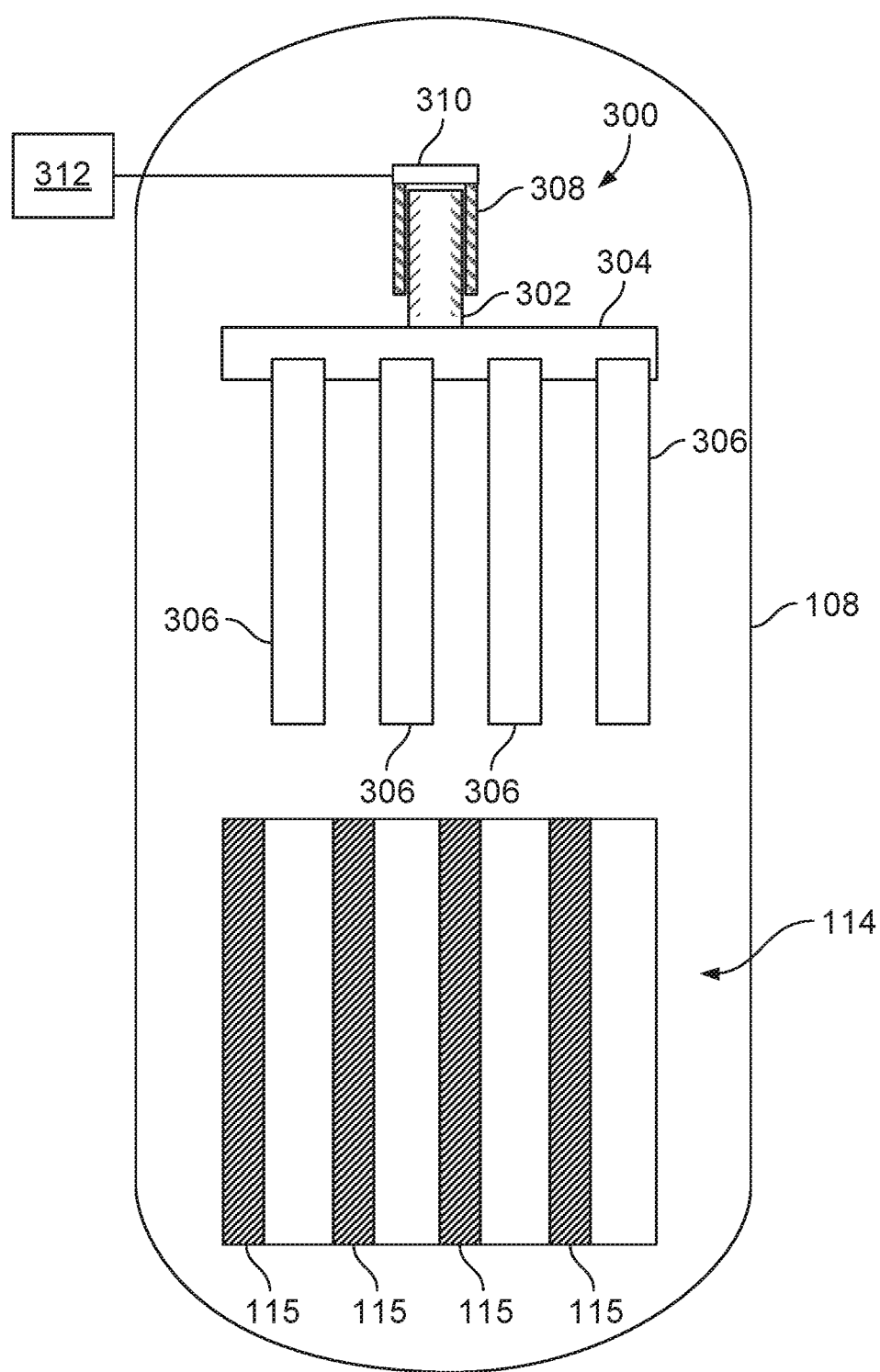
Figure 3C:
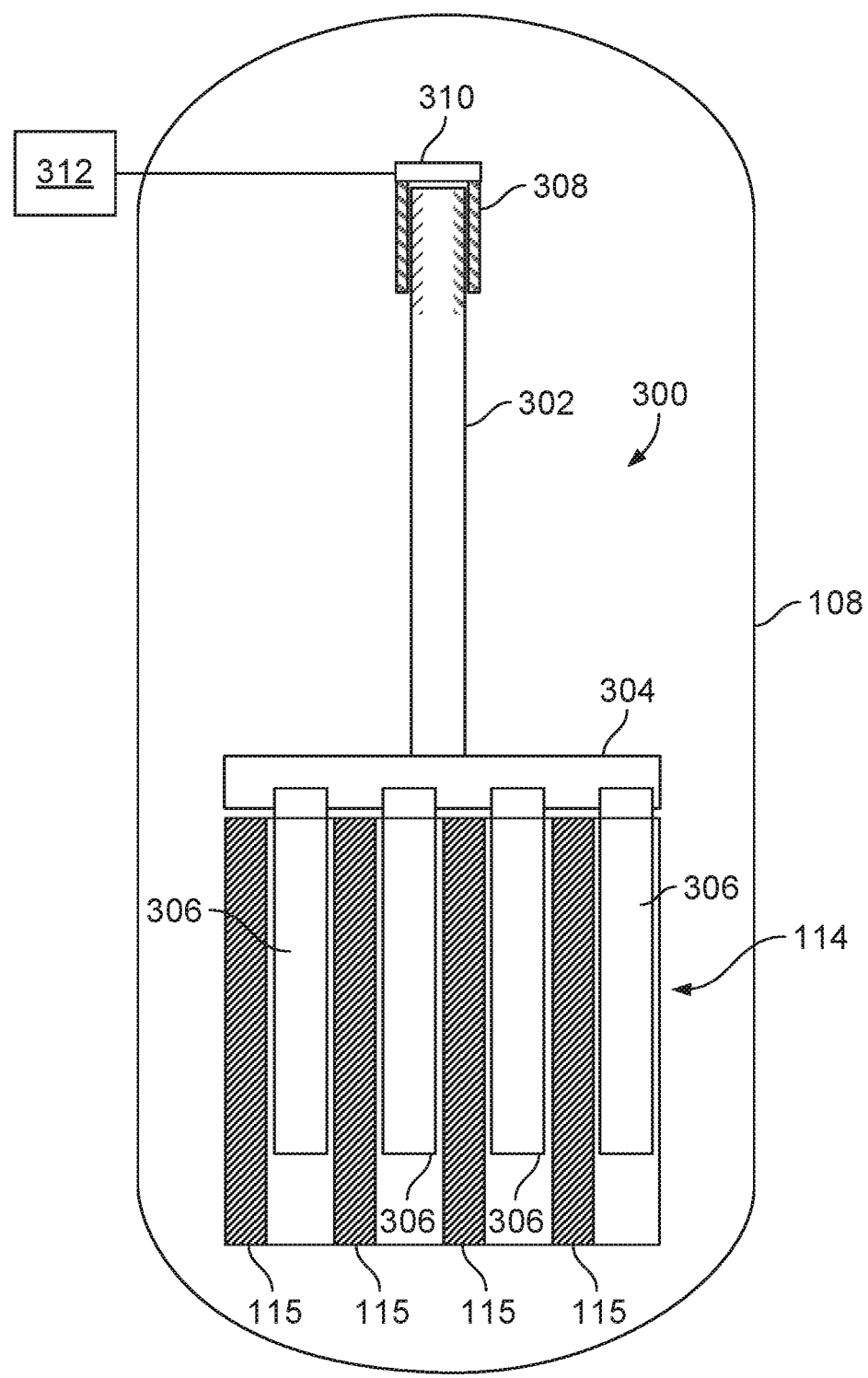

FIGS. 3A-3C are schematic illustrations of the binary positioning control rod assembly system 300 (CRA system 300). Generally, the system 300 may operationally exist in one (and only one) of two operational states at any moment in time. For example, one of the two operational states may be an "inactive" state in which every control rod assembly of the binary position CRA system 300 is fully withdrawn from a core 114 of the RXM 102 and none of the control rod assemblies affect (i.e., absorb neutrons) an ongoing fission reaction that occurs in the core 114. In some aspects, the term "fully withdrawn" means that bottom ends of the control rods are completely vertically above (in the case of a CRA system 300 mounted vertically above the core 114) or are completely vertically below (in the case of a CRA system 300 mounted vertically below the core 114) all of the fuel assemblies in the core 114. The other of the two operational states may be an "active" state in which every control rod assembly of the binary position CRA system 300 is fully inserted into the core 114 of the RXM 102 and all of the control rod assemblies operate to shut down the fission reaction that occurs in the core 114. In some aspects, the term "fully inserted" means that the CRA system 300 is in a position in which a manifold of the system 300 is directly adjacent (e.g., on top of) top (or bottom) ends of the fuel assemblies of the core 114.

FIG. 3A shows the CRA system 300 (schematically) mounted above the core 114 in the reactor vessel 108. FIG. 3B shows a more detailed schematic illustration of the CRA system 300 in an inactive or fully withdrawn state, in which the CRA system 300 does not affect normal operation of the RXM 102 (and does not affect by reducing or increasing any power output of the RXM 102). FIG. 3C shows a more detailed schematic illustration of the CRA system 300 in an active or fully inserted state, in which the CRA system 300 operates to shut down a nuclear fission reaction of the RXM 102 and/or maintain the nuclear fission reaction of the RXM 102 at a subcritical state.

As shown in FIGS. 3B-3C, the illustrated CRA system 300 includes a drive mechanism 308, a drive actuator 310, a drive shaft 302, and a manifold 304. The illustrated CRA system 300, as shown, is illustrated mounted in the reactor vessel 108 and is coupled to control rods 306. Although not specifically shown, there may be multiple (e.g., 16) banks or groups of control rods 306, with each bank or group consisting of multiple (e.g., four) control rods 306 (which each may consist of multiple control rodlets). Thus, reference to operation of control rods 306 may refer to operation (e.g., movement from fully withdrawn to fully inserted) of all control rods 306 or one or more banks of control rods 306. The control rods 306, in FIG. 3B, are illustrated as fully withdrawn from the core 114 (and the control rods 306 are not affecting the nuclear fission reaction in the core 114 in this position).

In the illustrated embodiment, the actuator 310 of the drive mechanism 308 is communicably coupled to a control system 312. Generally, the control system 312 may receive information (e.g., temperature, pressure, flux, valve status, pump status, or other information) from one or more sensors of the nuclear reactor system 100 and, based on such information, control the actuator 310 to energize the drive mechanism 308 (e.g., during an ECCS event). In some implementations, the control system 312 may be a main controller (i.e., processor-based electronic device or other electronic controller) of the nuclear reactor system. For example, the main controller may be a master controller communicably coupled to slave controllers at the respective control valves. In some implementations, the control system 312 may be a Proportional-Integral-Derivative (PID) controller, a ASIC (application specific integrated circuit), microprocessor based controller, or any other appropriate controller. In some implementations, the control system 312 may be all or part of a distributed control system.

The illustrated drive mechanism 308 is coupled (e.g., threadingly) to the drive shaft 302 and operable, in response to operation of the actuator 310, to adjust a location of the control rods 306 in the reactor vessel 102 by lowering or dropping the manifold 304 on the drive shaft 302. Thus, in some aspects, the drive mechanism 308 may operate simply to drop the control rods 306 into the core (fully inserted) such as in response to an ECCS event. In some aspects, the drive mechanism 308 may not apply a positive force to move the drive shaft 302 and manifold 304 but may simply support these components to oppose a downward force of gravity. For example, the control rods 306 may hang from the manifold 304 under their own weight due to gravity. For insertion, the drive mechanism 308 may simply stop any opposition to a force of gravity acting on the control rods 306, thereby allowing the rods 306 to drop of their own weight into the core 114 (e.g., in the case of rods 306 mounted above the core 114). In the case of rods 306 mounted below the core 114 (not shown in FIGS. 3A-3C), the drive mechanism 308 may, upon an actuation event, apply a positive force opposite to gravity in a bottom mounted drive mechanism (both of which are contemplated by the present disclosure) to drive the control rods 306 up into the core 114 (into a fully inserted position).

In some aspects, the actuator 310 and drive mechanism 308 may only operate to release or drop the manifold 304 (and thus the control rods 306) into a fully inserted position in the reactor core 114. Thus, in some aspects, once the control rods 306 are in a fully inserted position (e.g., to stop the nuclear fission reaction during an ECCS event), the actuator 310 and drive mechanism 308 are not able to move the control rods 306 into the fully withdrawn position. In some aspects, in order to reset the control rods 306 to the fully withdrawn position, the RXM 102 must be shut down and the reactor vessel 108 opened in order to move the control rods 306 to the fully withdrawn position.

Figure 4:
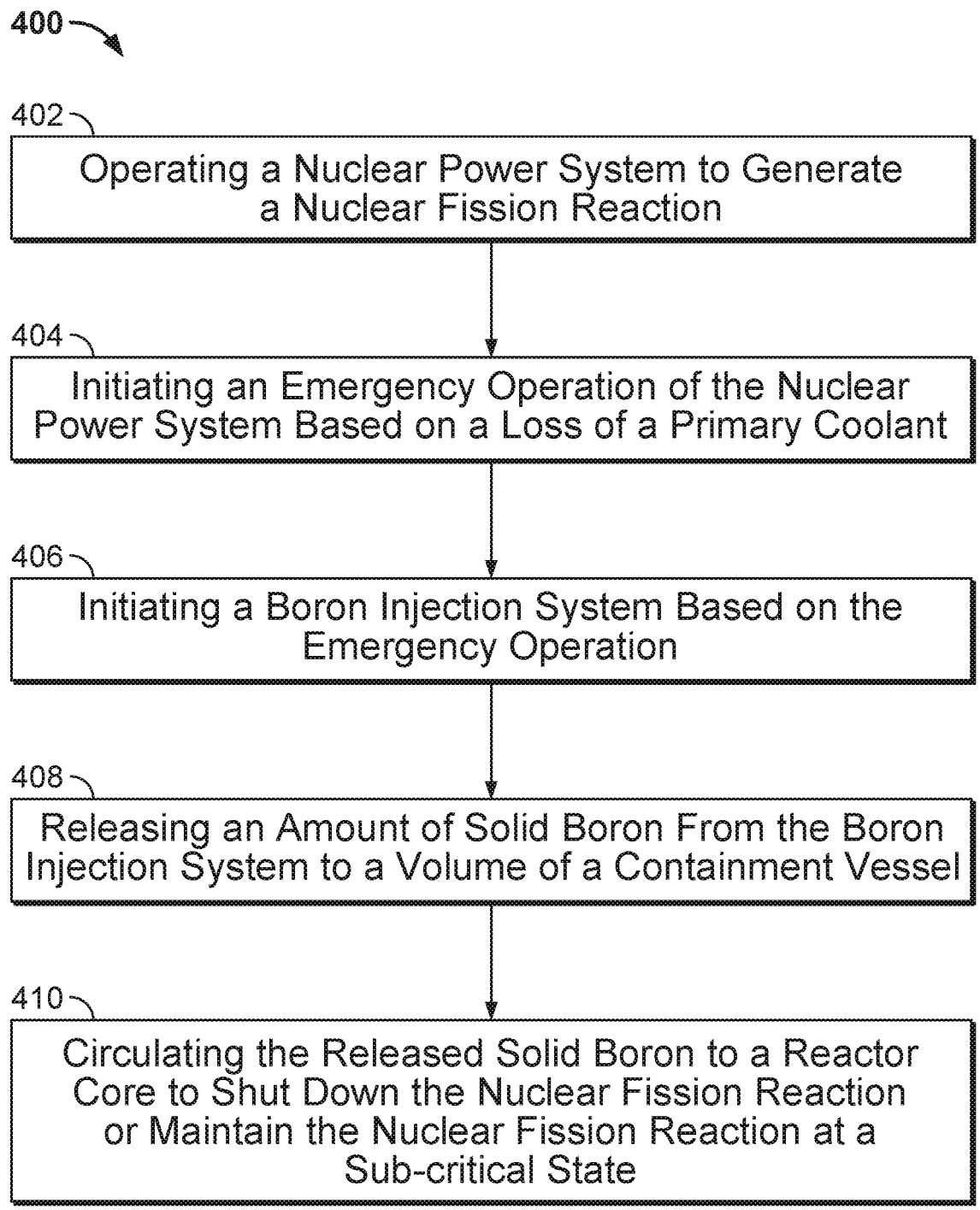
FIGS. 4-6 are flowcharts that describe example processes according to the present disclosure.

FIG. 4 is a flowchart that describes an example process 400 according to the present disclosure. Process 400, for example, describes steps of an operation in which a passive boron injection system is operated to shut down a nuclear fission reaction during, e.g., an ECCS event, or maintain the nuclear fission reaction in a sub-critical state. In some aspects, process 400 may be implemented by or with the nuclear power system 100 shown in either one of FIGS. 1A-1B.

Process 400 begins at step 402, which includes operating a nuclear power system to generate a nuclear fission reaction. For example, as described with reference to FIG. 1A or 1B, the nuclear power system 100 may be operated to generate a nuclear fission reaction in the RXM 102 such that electric power is generated by the power generation system 150. In some aspects, the RXM 102 may operate to generate and manage the nuclear fission reaction without any control rod assembly systems or devices (i.e., no control rod assemblies are positioned or found in the reactor vessel of the RXM 102). In process 400, as shown in FIGS. 1A-1B, a passive boron injection system 200 is positioned in the volume 112 of the containment vessel 110. During normal operation of the RXM 102 (i.e., not an emergency event, SCRAM event, or ECCS event, etc.), there is no fluid communication between the volume 112 and the volume 118. More specifically, no boron from the boron injection system 200 is introduced into the volume 118 during normal operation of the RXM 102.

Process 400 may continue at step 404, which includes initiating an emergency operation of the nuclear power system based on a loss of a primary coolant. For example, the RXM 102 may experience an emergency event, such as an ECCS event in which a primary coolant level in the reactor vessel 108 may drop (e.g., to just above the core 114) and a pressure in the reactor vessel 108 exceeds a venting pressure threshold (e.g., thereby releasing vaporized primary coolant 207 to the containment vessel 110 through valve 130 as shown in FIG. 1A). At this event, the nuclear fission reaction may not be controllable and/or may approach a critical state.

Process 400 may continue at step 406, which includes initiating a boron injection system based on the emergency operation. For example, based on the reactor vessel 108 venting (e.g., due to pressure build up in the vessel 108) vaporized primary coolant may circulate from the volume 118 of the reactor vessel 108 to the volume 112 of the containment vessel 110. Based on the pressure or temperature of the vented vaporized primary coolant into the volume 112, a boron container that holds the amount of solid boron may open, melt or dissolve (e.g., at least partially). Alternatively, the boron container may be mounted in a position of the volume 112 in which cooled and condensed primary coolant (shown as 209 in FIG. 1A) in the volume (e.g., condensed by heat transfer to the pool 106) contacts the boron container (as a water soluble container) and dissolves the container (e.g., at least partially).

Process 400 may continue at step 408, which includes releasing an amount of solid boron from the boron injection system to a volume of a containment vessel. For example, once the boron container opens, or melts, or dissolves (at least partially), the amount of solid boron in the container may be released into the volume 112 of the containment vessel 110 to mix with the primary coolant in the volume 112. As some of the primary coolant that vents as steam condenses in the volume 112 (e.g., condensed by heat transfer to the pool 106), the solid boron mixes with the primary (liquid) coolant (shown as 209) and, e.g., goes into solution.

Process 400 may continue at step 410, which includes circulating the released solid boron to a reactor core to shut down the nuclear fission reaction or maintain the nuclear fission reaction at a sub-critical state. For example, a mixture of the solid boron and condensed primary coolant in the volume 112 circulates back to the reactor core 114 through valve 132 (e.g., which opens also in response to the emergency event, as does valve 130). The amount of solid boron, when in solution with the condensed primary coolant 209, is sufficient to shut down the nuclear fission reaction or maintain the nuclear fission reaction at a sub-critical state.

Figure 5:
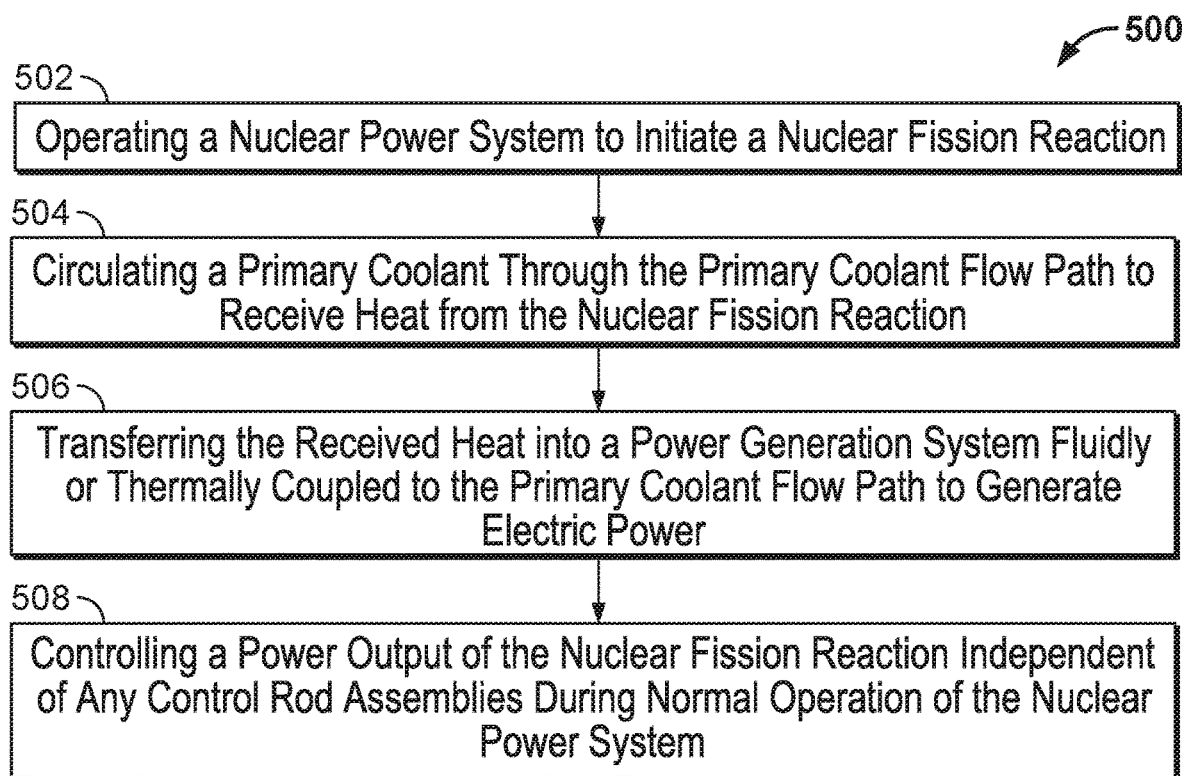

FIG. 5 is a flowchart that describes an example process 500 according to the present disclosure. Process 500, for example, describes steps of an operation in which a power output of a nuclear power system is controlled during normal operation of the system without any use or presence of any control rod assemblies within a nuclear reactor module of the nuclear power system. In some aspects, process 500 may be implemented by or with the nuclear power system 100 shown in either one of FIG. 1A or 2A.

Process 500 begins at step 502, which includes operating a nuclear power system to initiate a nuclear fission reaction. For example, as described with reference to FIG. 1A or 2A, the nuclear power system 100 may be operated to initiate and maintain a nuclear fission reaction in the RXM 102 such that electric power is generated by the power generation system 150. The RXM 102 operates to generate and manage the nuclear fission reaction without any control rod assembly systems or devices (i.e., no control rod assemblies are positioned or found in the reactor vessel of the RXM 102).

Process 500 may continue at step 504, which includes circulating a primary coolant through the primary coolant flow path to receive heat from the nuclear fission reaction. For example, primary coolant 128 flows (e.g., naturally, without pumping) from a bottom of the reactor vessel 108, through the core 114 where it receives heat from the initiated nuclear fission reaction, and (as it gains buoyancy due to the heat) through the riser 116 toward the top of the vessel 108. As shown, the vessel 108 is not sized to accommodate any control rod assembly system (e.g., no control rods, no control rod assembly motors). The primary coolant 128 exits the riser 116 at the top of the reactor vessel 108 and travels toward the bottom of the reactor vessel 108 in the annulus between the riser 116 and an interior surface of the vessel 108.

Process 500 may continue at step 506, which includes transferring the received heat into a power generation system fluidly or thermally coupled to the primary coolant flow path to generate electric power. For example, as shown in FIGS. 1A and 2A, power generator system 150 is thermally coupled to the RXM 102 through steam generators 124, through which a secondary coolant (i.e., working fluid of the power generator system 150) flows to receive heat from the primary coolant 128 (as it flows through the riser 116 and the annulus). Although FIGS. 1A and 2A illustrate a PWR (e.g., in which a secondary coolant drives the power generation equipment), in some aspects, process 500 may use a BWR in which vaporized primary coolant directly drives the power generation equipment (e.g., the steam turbine 158 coupled to the generator 160).

Process 500 may continue at step 508, which includes controlling a power output of the nuclear fission reaction independent of any control rod assemblies during normal operation of the nuclear power system (e.g., exclusive of an emergency event, such as ECCS or otherwise). For example, in some aspects, the power output can be controlled by controlling (e.g., with control system 999) one or more parameters of the power generation system or a chemical control system (e.g., system 190). For instance, in some aspects, the control system 999 may adjust the steam inlet valve 154 open (e.g., to increase power output), which increases a temperature of the primary coolant 128 in the core 114, thereby increasing power output of the nuclear fission reaction. Conversely, in some aspects, the control system 999 may adjust the steam inlet valve 154 closed (e.g., to decrease power output), which decreases the temperature of the primary coolant 128 in the core 114, thereby decreasing power output of the nuclear fission reaction.

As another example, in some aspects, the control system 999 may increase the flow rate of the feed water 182 from the pump 170 (e.g., by increasing a speed of the pump 170 through the motor controller 172 as a variable speed drive), which decreases the temperature of the primary coolant 128 in the core 114, thereby decreasing power output of the nuclear fission reaction. Conversely, in some aspects, the control system 999 may decrease the flow rate of the feed water 182 from the pump 170 (e.g., by decreasing the speed of the pump 170 through the motor controller 172), which increases the temperature of the primary coolant 128 in the core 114, thereby increasing power output of the nuclear fission reaction.

As another example, in some aspects, the control system 999 may increase a temperature of the feed water 182 (e.g., by adjusting operation of the heat exchanger 174), which decreases the temperature of the primary coolant 128 in the core 114, thereby decreasing power output of the nuclear fission reaction. Conversely, in some aspects, the control system 999 may decrease the temperature of the feed water 182 (e.g., by adjusting operation of the heat exchanger 174), which increases the temperature of the primary coolant 128 in the core 114, thereby increasing power output of the nuclear fission reaction.

As another example, the control system 999 may control the chemical injection system 190 to control a power output of the nuclear fission reaction. For example, the control system 999 may control the chemical injection system 190 to release more chemical (e.g., boron or other neutron-absorbing chemical) into the reactor vessel 108 to decrease the power output of the nuclear fission reaction. Conversely, the control system 999 may control the chemical injection system 190 to remove the chemical (e.g., boron or other neutron-absorbing chemical) from the reactor vessel 108 to increase the power output of the nuclear fission reaction. In some aspects, process 400 includes operating the passive boron injection system 200 (shown in FIG. 1A) to shut down the nuclear fission reaction or maintain the reaction in a sub-critical state absent the presence or operation of any control rod assemblies in the RXM 102.

Figure 6:
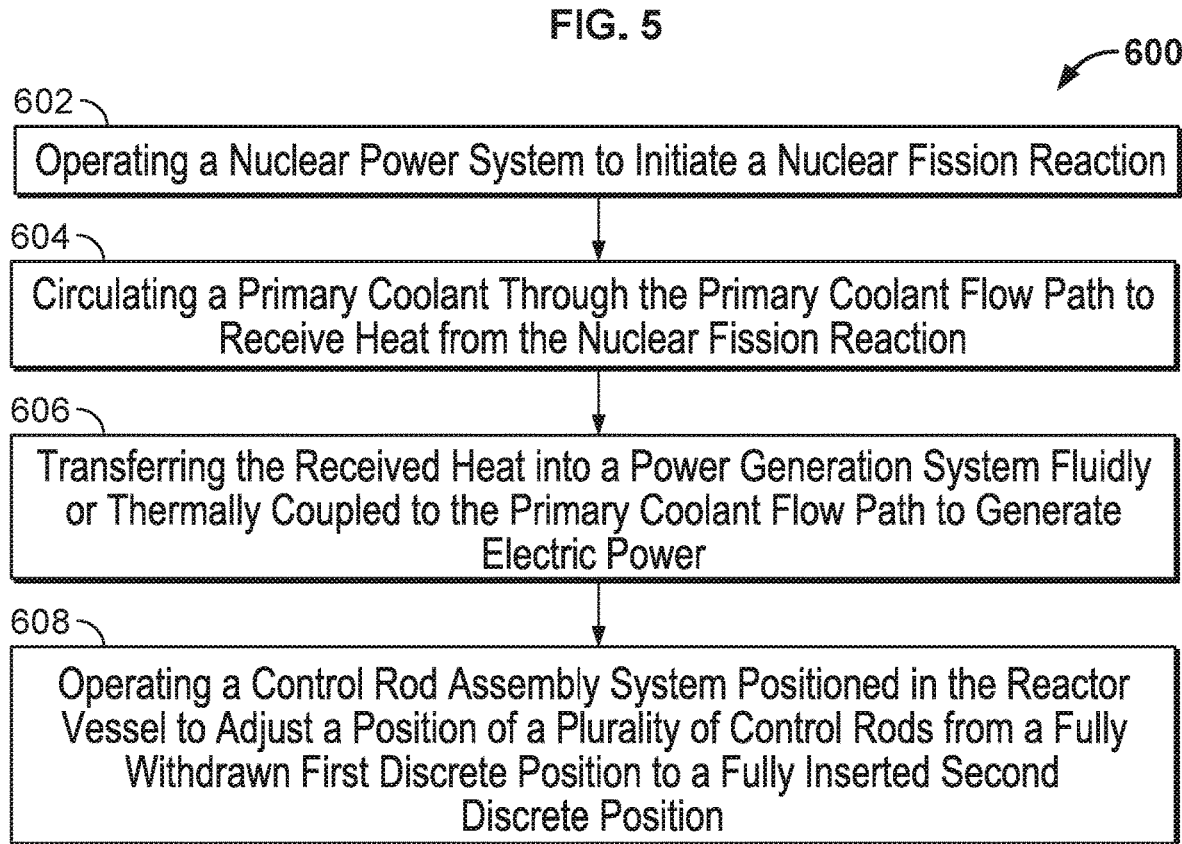

FIG. 6 is a flowchart that describes an example process 600 according to the present disclosure. Process 600, for example, describes steps of an operation in which a power output of a nuclear power system is controlled during normal operation of the system without the use of control rod assembly, but with a system that includes a binary position control rod assembly system in which the control rods are positionable (i.e., in a stationary position) in only two discrete positions (e.g., a fully withdrawn position and a fully inserted position). In some aspects, process 600 may be implemented by or with the nuclear power system 100 shown in either one of FIG. 1B or 2B in conjunction with FIGS. 3A-3C.

Process 600 begins at step 602, which includes operating a nuclear power system to initiate a nuclear fission reaction. For example, as described with reference to FIG. 1B or 2B, the nuclear power system 100 may be operated to initiate and maintain a nuclear fission reaction in the RXM 102 such that electric power is generated by the power generation system 150. The RXM 102 operates to generate and manage the nuclear fission reaction without any control rod assembly systems or devices (i.e., no control rod assemblies are positioned or found in the reactor vessel of the RXM 102).

Process 600 may continue at step 604, which includes circulating a primary coolant through the primary coolant flow path to receive heat from the nuclear fission reaction. For example, primary coolant 128 flows (e.g., naturally, without pumping) from a bottom of the reactor vessel 108, through the core 114 where it receives heat from the initiated nuclear fission reaction, and (as it gains buoyancy due to the heat) through the riser 116 toward the top of the vessel 108. As shown, the vessel 108 is not sized to accommodate any control rod assembly system (e.g., no control rods, no control rod assembly motors). The primary coolant 128 exits the riser 116 at the top of the reactor vessel 108 and travels toward the bottom of the reactor vessel 108 in the annulus between the riser 116 and an interior surface of the vessel 108.

Process 600 may continue at step 606, which includes transferring the received heat into a power generation system fluidly or thermally coupled to the primary coolant flow path to generate electric power. For example, as shown in FIGS. 1B and 2B, power generator system 150 is thermally coupled to the RXM 102 through steam generators 124, through which a secondary coolant (i.e., working fluid of the power generator system 150) flows to receive heat from the primary coolant 128 (as it flows through the riser 116 and the annulus). Although FIGS. 1B and 2B illustrate a PWR (e.g., in which a secondary coolant drives the power generation equipment), in some aspects, process 600 may use a BWR in which vaporized primary coolant directly drives the power generation equipment (e.g., the steam turbine 158 coupled to the generator 160).

Process 600 may continue at step 608, which includes operating a control rod assembly system positioned in the reactor vessel to adjust a position of a plurality of control rods from a fully withdrawn first discrete position to a fully inserted second discrete position. For example, with reference to FIGS. 3A-3C, the binary position CRA system 300 is operable to position the control rods 306 in only two positions. The first position, shown in FIG. 3B, is when the control rods 306 are fully withdrawn from the reactor core 114. As shown in that figure, the control rods 306 are held stationary above the core 114 such that the control rods 306 exert no or insubstantial effect on the nuclear fission reaction generated by the fuel assemblies 115 in the core 114. The second position, shown in FIG. 3C, is when the control rods 306 are fully inserted into the reactor core 114. As shown in that figure, the control rods 306 (having been moved or dropped from the first position) are positioned adjacent the nuclear fuel assemblies 115 in the core 114. In the second position, for example, the control rods 306 shutdown or maintain the nuclear fission reaction generated by the fuel assemblies 115 in the core 114 at a sub-critical state.

FIG. 7 is a schematic diagram of a control system (or controller) 700 of all or part of a nuclear power system, such as the control system 999 shown in FIGS. 1A-1B and 2A-2B or the control rod assembly controller 312 shown schematically in FIGS. 3B-3C. The system 700 can be used for the operations described in association with any of the computer-implemented methods described previously.

The system 700 is intended to include various forms of digital computers, such as laptops, desktops, workstations, personal digital assistants, servers, blade servers, mainframes, and other appropriate computers. The system 700 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of embodiments have been described. Nevertheless, it will be understood that various modifications may be made without departing from the spirit and scope of what is described. For example, the steps of the exemplary flow charts in FIGS. 4-6 may be performed in other orders, some steps may be removed, and other steps may be added. Accordingly, other embodiments are within the scope of the following claims.

What is claimed is:

1. A nuclear power system, comprising:
   a reactor vessel that comprises a reactor core mounted within a volume of the reactor vessel, wherein the reactor core comprises one or more nuclear fuel assemblies configured to generate a nuclear fission reaction, and wherein the reactor vessel does not include any control rod assemblies therein;
   a riser positioned above the reactor core;
   a primary coolant flow path that extends from a bottom portion of the volume below the reactor core, through the reactor core, within the riser, and through an annulus between the riser and the reactor vessel back to the bottom portion of the volume;
   a primary coolant that circulates through the primary coolant flow path to receive heat from the nuclear fission reaction and release the received heat to generate electric power in a power generation system coupled to the primary coolant flow path;
   a chemical injection system in fluid communication with the primary coolant flow path; and
   a control system communicably coupled to the power generation system and the chemical injection system, wherein the control system is configured to control a power output of the nuclear fission reaction independent of any control rod assemblies by controlling one or more parameters of at least one of the power generation system or the chemical injection system, and wherein the control system is configured to perform operations to control one or more parameters of the chemical injection system, the operations comprising:
      determining that the power output of the nuclear fission reaction is greater than an upper value or less than a lower value;
      based on the determination, adjusting an amount of a chemical injected into the reactor core from the chemical injection system to adjust the power output of the nuclear fission reaction; and
      subsequent to the adjustment, determining that the power output is within a range.

2. The nuclear power system of claim 1, wherein the control system is further configured to perform operations to control one or more parameters of the power generation system comprising:
   based on the determination, controlling the power generation system to adjust at least one of a turbine inlet steam valve or a feed water pump to adjust the power output of the nuclear fission reaction.

3. The nuclear power system of claim 2, wherein the operation of controlling the power generation system to adjust the turbine inlet steam valve comprises at least one of:
   adjusting the turbine inlet steam valve toward a fully closed position to decrease the power output of the nuclear fission reaction; or
   adjusting the turbine inlet steam valve toward a fully open position to increase the power output of the nuclear fission reaction.

4. The nuclear power system of claim 2, wherein the operation of controlling the power generation system to adjust the feed water pump comprises at least one of:
   decreasing an output flowrate of the feed water pump to decrease the power output of the nuclear fission reaction; or
   increasing the output flowrate of the feed water pump to increase the power output of the nuclear fission reaction.

5. The nuclear power system of claim 1, further comprising:
   a containment vessel sized to enclose the reactor vessel such that an open volume is defined between the containment vessel and the reactor vessel; and
   a boron injection system positioned in the open volume and comprising an amount of boron sufficient to stop the nuclear fission reaction or maintain the nuclear fission reaction at a sub-critical state.

6. The nuclear power system of claim 5 wherein the boron injection system comprises a boron container sized to hold or enclose the amount boron, and wherein the boron container is configured to release the amount of boron directly into the open volume in response to at least one of a predetermined temperature and pressure within the open volume such that the amount of boron is in fluid communication with an inner surface of the containment vessel.

7. A nuclear power system, comprising:
   a reactor vessel that comprises a reactor core mounted within a volume of the reactor vessel, the reactor core comprising one or more nuclear fuel assemblies configured to generate a nuclear fission reaction;
   a riser positioned above the reactor core;
   a primary coolant flow path that extends from a bottom portion of the volume below the reactor core, through the reactor core, within the riser, and through an annulus between the riser and the reactor vessel back to the bottom portion of the volume;
   a primary coolant that circulates through the primary coolant flow path to receive heat from the nuclear fission reaction and release the received heat to generate electric power in a power generation system fluidly or thermally coupled to the primary coolant flow path;
   a chemical injection system in fluid communication with the primary coolant flow path; and
   a control system communicably coupled to the chemical injection system, wherein the control system is configured to perform operations to control one or more parameters of the chemical injection system to control a power output of the nuclear fission reaction independent of any control rod assemblies during the normal operation, the operations comprising:

determining that the power output of the nuclear fission reaction is greater than an upper value or less than a lower value;

based on the determination, adjusting an amount of a chemical injected into the reactor core from the chemical injection system to adjust the power output of the nuclear fission reaction, wherein the operation of adjusting the amount of the chemical injected into the reactor core from the chemical injection system comprises at least one of:

increasing the amount of the chemical injected into the reactor core from the chemical injection system to decrease the power output of the nuclear fission reaction; or decreasing the amount of the chemical injected into the reactor core from the chemical injection system to increase the power output of the nuclear fission reaction; and subsequent to the adjustment, determining that the power output is within a range between the upper and lower values.

8. A method for controlling a nuclear fission reaction, comprising:

operating a nuclear power system to initiate a nuclear fission reaction, the nuclear power system comprising:

a reactor vessel that comprises a reactor core mounted within a volume of the reactor vessel, the reactor core comprising one or more nuclear fuel assemblies configured to initiate and maintain the nuclear fission reaction during a normal operation, wherein the reactor vessel does not include any control rod assemblies therein, a riser positioned above the reactor core, a primary coolant flow path that extends from a bottom portion of the volume below the reactor core, through the reactor core, within the riser, and through an annulus between the riser and the reactor vessel back to the bottom portion of the volume; and a chemical injection system in fluid communication with the primary coolant flow path;

circulating a primary coolant through the primary coolant flow path to receive heat from the nuclear fission reaction;

transferring the received heat into a power generation system fluidly or thermally coupled to the primary coolant flow path to generate electric power; and controlling a power output of the nuclear fission reaction independent of any control rod assemblies during the normal operation by:

determining that the power output of the nuclear fission reaction is greater than an upper value or less than a lower value;

based on the determination, adjusting an amount of a chemical injected into the reactor core from the chemical injection system to adjust the power output of the nuclear fission reaction; and subsequent to the adjustment, determining that the power output is within a range between the upper and lower values.

9. The method of claim 8, wherein adjusting the amount of the chemical injected into the reactor core from the chemical injection system comprises at least one of:

increasing the amount of the chemical injected into the reactor core from the chemical injection system to decrease the power output of the nuclear fission reaction; or decreasing the amount of the chemical injected into the reactor core from the chemical injection system to increase the power output of the nuclear fission reaction.

10. The method of claim 8, wherein controlling the power output of the nuclear fission reaction further comprises:

based on the determination, controlling the power generation system to adjust at least one of a turbine inlet steam valve or a feed water pump to adjust the power output of the nuclear fission reaction.

11. The method of claim 10, wherein controlling the power generation system to adjust the turbine inlet steam valve comprises at least one of:

adjusting the turbine inlet steam valve toward a fully closed position to decrease the power output of the nuclear fission reaction; or adjusting the turbine inlet steam valve toward a fully open position to increase the power output of the nuclear fission reaction.

12. The method of claim 10, wherein controlling the power generation system to adjust the feed water pump comprises at least one of:

decreasing an output flowrate of the feed water pump to decrease the power output of the nuclear fission reaction; or increasing the output flowrate of the feed water pump to increase the power output of the nuclear fission reaction.

13. A pressurized water reactor (PWR), comprising:

a control rod assembly-less reactor module that comprises:

a reactor vessel comprising a volume sized to enclose a reactor core, a riser, and a steam generator without enclosing a control rod assembly system, wherein the reactor core comprises one or more nuclear fuel assemblies configured to generate a nuclear fission reaction, and wherein the reactor vessel includes a primary coolant flow path that extends from a bottom portion of the volume below the reactor core, through the reactor core, within the riser, and through an annulus between the riser and the reactor vessel back to the bottom portion of the volume;

a chemical injection system in fluid communication with the primary coolant flow path; and a containment vessel comprising a volume sized to enclose the reactor vessel and the chemical injection system;

a power generation system comprising a steam conduit in fluid communication with the steam generator, a steam turbine-generator, and a steam condenser; and a control system communicably coupled to the power generation system and the chemical injection system, wherein the control system is configured to control a power output of the nuclear fission reaction independent of any control rod assemblies by controlling one or more parameters of at least one of the power generation system or the chemical injection system, and wherein the control system is configured to perform operations to control one or more parameters of the chemical injection system, the operations comprising:

determining that the power output of the nuclear fission reaction is greater than an upper value or less than a lower value;

based on the determination, adjusting an amount of a chemical injected into the reactor core from the chemical injection system to adjust the power output of the nuclear fission reaction; and subsequent to the adjustment, determining that the power output is within a range between the upper and lower values.

14. The PWR of claim 13, wherein the volume of the reactor vessel is less than a volume of a conventional reactor vessel sized to enclose a control rod assembly system.

15. The PWR of claim 13, wherein the control system is further configured to adjust the power output of the nuclear fission reaction by controlling at least one of a flowrate or pressure of a steam supply to the steam turbine generator or a flowrate or temperature of a feed water circulated from the steam condenser to the steam generator.

16. The PWR of claim 15, further comprising a passive boron injection system electrically decoupled from a Class 1E power source that is electrically coupled to the reactor module.

17. The PWR of claim 16, wherein the passive boron injection system is positioned in the volume of the containment vessel and fluidly isolated from the volume of the reactor vessel during normal operation of the reactor module.

18. The PWR of claim 17, wherein the passive boron injection system is configured to release an amount of solid boron sufficient to shut down a nuclear fission reaction of the reactor module during an emergency core cooling system (ECCS) event.

* * * * *

UNITED STATES PATENT AND TRADEMARK OFFICE
CERTIFICATE OF CORRECTION

| | |
|---|---|
| PATENT NO. | : 11,380,448 B2 |
| APPLICATION NO. | : 16/237059 |
| DATED | : July 5, 2022 |
| INVENTOR(S) | : Allyson Callaway et al. |

It is certified that error appears in the above-identified patent and that said Letters Patent is hereby corrected as shown below:

On the Title Page

Item (57), in Column 2, in "Abstract", Line 4, delete "reaction vessel does not" and insert -- reactor vessel does not --.

In the Specification

In Column 15, Line 42, delete "1 B" and insert -- 1B --.

Signed and Sealed this
Sixteenth Day of May, 2023

Katherine Kelly Vidal
*Director of the United States Patent and Trademark Office*